(12) United States Patent
Balsam et al.

(10) Patent No.: US 12,461,706 B2
(45) Date of Patent: Nov. 4, 2025

(54) MODIFYING A SOUND IN A USER ENVIRONMENT IN RESPONSE TO DETERMINING A SHIFT IN USER ATTENTION

(71) Applicant: Meta Platforms Technologies, LLC, Menlo Park, CA (US)

(72) Inventors: Nava K. Balsam, Woodinville, WA (US); Khia Johnson, Seattle, WA (US); Haniyeh Salehi, Statesville, NC (US); Ishwarya Ananthabhotla, Cambridge, MA (US); Antje Ihlefeld, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 266 days.

(21) Appl. No.: 18/122,371

(22) Filed: Mar. 16, 2023

(65) Prior Publication Data

US 2024/0311076 A1   Sep. 19, 2024

(51) Int. Cl.

| | |
|---|---|
| *G06F 3/01* | (2006.01) |
| *G06F 3/16* | (2006.01) |
| *G06F 40/58* | (2020.01) |
| *G10L 15/00* | (2013.01) |
| *G10L 15/22* | (2006.01) |
| *H04R 1/10* | (2006.01) |

(52) U.S. Cl.
CPC .............. *G06F 3/165* (2013.01); *G06F 3/013* (2013.01); *G06F 40/58* (2020.01); *G10L 15/005* (2013.01); *G10L 15/22* (2013.01); *H04R 1/1041* (2013.01)

(58) Field of Classification Search
CPC ....... H04R 1/1041; H04S 7/304; H04S 7/303; G06F 3/165; G06F 3/013
See application file for complete search history.

(56) References Cited

U.S. PATENT DOCUMENTS

| | | | |
|---|---|---|---|
| 11,457,847 B2 * | 10/2022 | Palti-Wasserman ... | A61B 5/164 |
| 11,667,196 B2 * | 6/2023 | Lee ......................... | B60K 35/80 |
| | | | 701/36 |
| 11,822,367 B2 * | 11/2023 | Eubank .................. | G06V 40/28 |
| 2020/0097246 A1 | 3/2020 | McCoy et al. | |
| 2020/0209957 A1 | 7/2020 | Sztuk et al. | |
| 2021/0090548 A1 * | 3/2021 | Debner ................. | G10L 13/086 |
| 2024/0004605 A1 * | 1/2024 | Krisch .................... | G06F 1/163 |

OTHER PUBLICATIONS

European Search Report for European Patent Application No. 24159499.3, dated Jul. 11, 2024, 6 pages.

\* cited by examiner

*Primary Examiner* — Disler Paul

(74) *Attorney, Agent, or Firm* — Greenberg Traurig, LLP

(57) ABSTRACT

An eye tracking system tracks a position and an orientation of one or more eyes of a user of the eye tracking system and determines a gaze point of the user based on the position and the orientation of the user's eye(s). An audio system coupled to the eye tracking system then detects a sound in an environment of the user. A change in the gaze point of the user is detected at the eye tracking system. Based on the change in the gaze point, a determination is made as to whether the user's attention has shifted. Responsive to determining the user's attention has shifted, the sound is modified at the audio system and the modified sound is then communicated to the user.

20 Claims, 11 Drawing Sheets

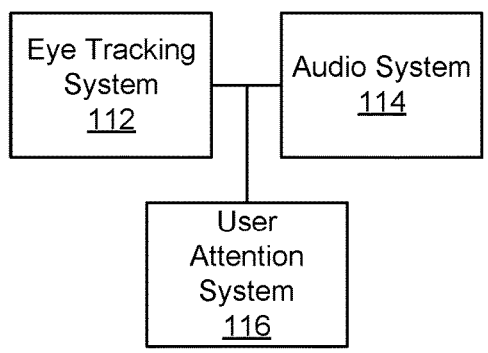
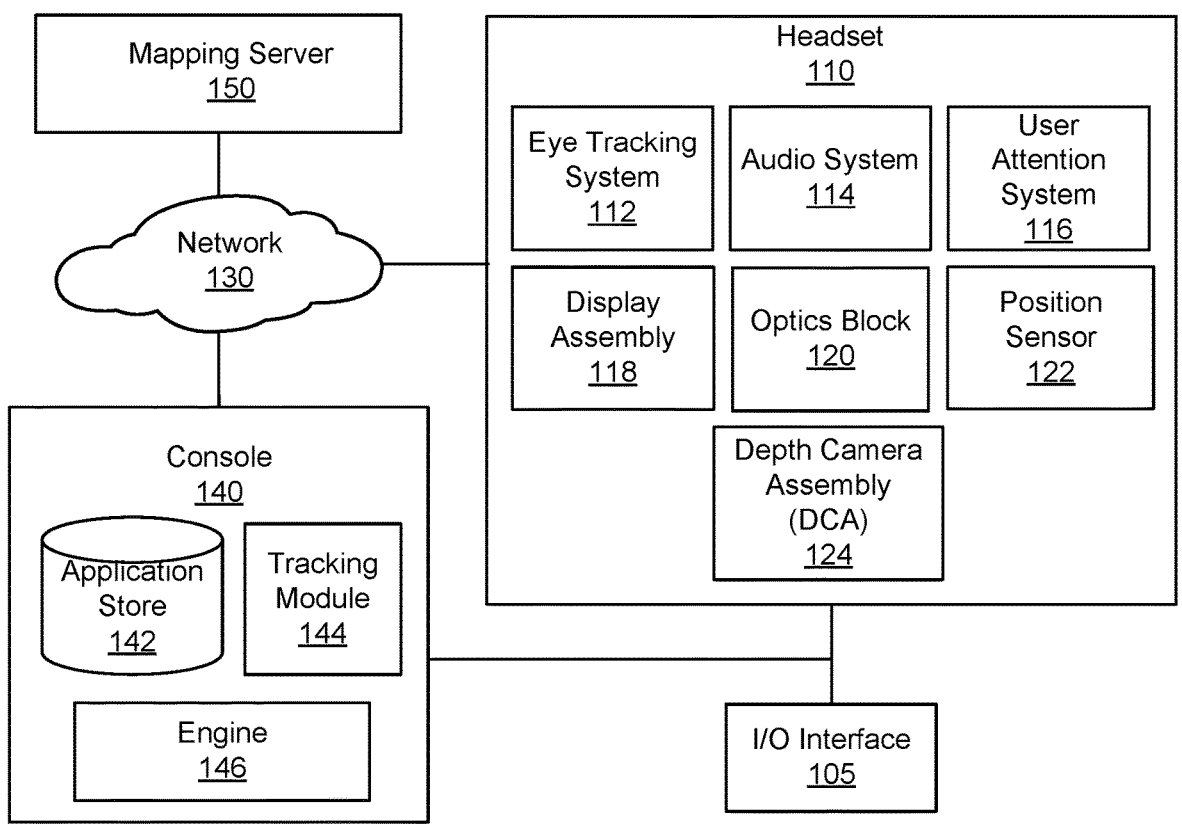
FIG. 1A
FIG. 1B

MODIFYING A SOUND IN A USER ENVIRONMENT IN RESPONSE TO DETERMINING A SHIFT IN USER ATTENTION

FIELD OF THE INVENTION

This disclosure relates generally to eye tracking systems, and more specifically to modifying a sound in a user environment in response to determining a shift in user attention based on a change in a gaze point of a user detected by an eye tracking system.

BACKGROUND

When performing a task that requires one's full attention, an individual may become distracted if their attention shifts away from the task. For example, an individual who is driving may stop paying attention to the road if their mobile phone rings and they look at their phone to find out who is calling them or if they take the call while driving. As an additional example, an individual who is on a video conference may shift their attention away from the conference if their mind wanders or if they hear a sound that is unrelated to the conference and look around for the source of the sound. Various negative consequences may result from being distracted. In the above examples, as a result of being distracted, the individual who is driving may take a wrong turn or get into an accident, while the individual who is on the video conference may be less productive, lose a client, or be disciplined by their employer.

SUMMARY

To recapture the attention of distracted individuals, an eye tracking system modifies a sound in a user environment in response to determining a shift in user attention. More specifically, the eye tracking system tracks a position and an orientation of one or more eyes of a user of the eye tracking system and determines a gaze point of the user based on the position and the orientation of the user's eyes. An audio system coupled to the eye tracking system then detects a sound in an environment of the user and the eye tracking system detects a change in the gaze point of the user. Based on the change in the gaze point, a determination is made as to whether the user's attention has shifted. Responsive to determining the user's attention has shifted, the sound is modified at the audio system and the modified sound is then communicated to the user.

BRIEF DESCRIPTION OF THE DRAWINGS

FIGS. 1A-1B are block diagrams of system environments in which an eye tracking system operates, in accordance with one or more embodiments.

Figure 2:
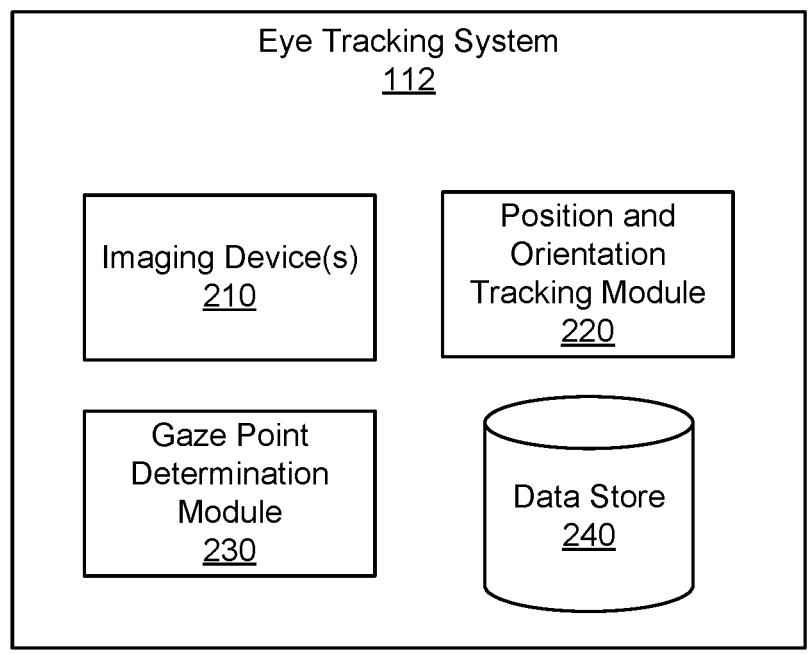
FIG. 2 is a block diagram of an eye tracking system, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, for example, virtual reality (VR), augmented reality (AR), mixed reality (MR), hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (e.g., stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. An artificial reality system that provides artificial reality content may be implemented on various platforms, including a wearable device (e.g., a headset) connected to a host computer system, a standalone wearable device (e.g., a headset), a mobile device or computing system, or any other hardware platform capable of providing artificial reality content to one or more viewers.

FIG. 1A is a block diagram of a system environment 100A in which an eye tracking system 112 operates, in accordance with one or more embodiments. The system environment 100A shown in FIG. 1A comprises the eye tracking system 112, an audio system 114, and a user attention system 116. In alternative configurations, different and/or additional components may be included in the system environment 100A. In some embodiments, all or some of the functionality of the user attention system 116 may be provided by the eye tracking system 112 and/or the audio system 114.

The eye tracking system 112, the audio system 114, and the user attention system 116 may be coupled in a way that allows them to communicate with each other (e.g., using wired and/or wireless communication systems). In some embodiments, the eye tracking system 112, the audio system 114, and/or the user attention system 116 are standalone systems, while in other embodiments, some or all of the components of the system environment 100A are included in the same system or device (e.g., a headset, a mobile device, a computing system, etc.). In yet other embodiments, the eye tracking system 112, the audio system 114, and the user attention system 116 are included in different systems or devices. For example, suppose that the eye tracking system 112 is included in a first wearable device (e.g., a headset) and the audio system 114 is included in a second wearable device (e.g., headphones) that is coupled to the first wearable device via Bluetooth. In this example, the user attention system 116 may be included in a mobile device having computer functionality, such as a smartphone, that is coupled to both wearable devices via a network (e.g., using a 4G or a 5G mobile communications protocol). In embodiments in which the system environment 100A includes additional components, the eye tracking system 112, the audio system 114, and/or the user attention system 116 may access these additional components. In such embodiments, one or more components of the system environment 100A may prompt the user to opt in to allow the eye tracking system 112, the audio system 114, and/or the user attention system 116 to access these additional components. If a user in the example above opts in, the eye tracking system 112 and the audio system 114 may access settings of the mobile device, a location of the mobile device, applications executing on the mobile device, etc.

The eye tracking system 112 tracks a position and an orientation of one or more eyes of a user and determines a gaze point of the user based on the position and the orientation of the eye(s). The position and the orientation of an eye may be tracked with regard to its pupil (e.g., a location of the pupil relative to other portions of the eye, a visibility of the pupil, a dilation of the pupil, a shape of the pupil, etc.). By tracking a position and an orientation of a user's eye(s), the eye tracking system 112 also may determine a gaze point of the user and detect changes in the gaze point of the user. In some embodiments, the eye tracking system 112 or a device/system (e.g., a headset) including or coupled to the eye tracking system 112 may prompt the user to opt in to allow operation of the eye tracking system 112. For example, by opting in, the eye tracking system 112 may detect and/or store images of the user's eye(s) or any eye tracking information of the user. The function of the eye tracking system 112 is further described below in conjunction with FIG. 2.

The audio system 114 detects sounds and communicates audio content to a user. The audio system 114 may comprise one or more acoustic sensors, one or more transducers, and an audio controller. The audio system 114 may detect sounds in an environment of a user, which may include a portion of a physical environment surrounding the user or a "local area" of the user and a portion of a digital environment of the user (e.g., a virtual local area of the user). Once the audio system 114 detects a sound in an environment of a user, the audio system 114 may determine a direction or a source of the sound. The audio system 114 also may modify a sound it detects in an environment of a user once the user attention system 116 determines the user's attention has shifted and may then communicate the modified sound to the user. Alternatively, the audio system 114 may replay audio data it has detected and recorded once the user attention system 116 determines a user's attention has shifted. In some embodiments, the audio system 114 may modify a sound or replay audio data by executing instructions received from the user attention system 116. In various embodiments, the audio system 114 also may provide spatialized audio content to a user. In some embodiments, the audio system 114 may access various acoustic parameters that describe one or more acoustic properties (e.g., room impulse response, a reverberation time, a reverberation level, etc.) for at least a portion of the environment of a user. The audio system 114 may then generate one or more sound filters using one or more of the acoustic parameters and use the sound filters to communicate audio content to the user. The function of the audio system 114 is further described below in conjunction with FIG. 3.

The user attention system 116 determines whether a user's attention has shifted. In some embodiments, the user attention system 116 may determine whether a user's attention has shifted based on a change in a gaze point of the user detected by the eye tracking system 112 (e.g., whether a correlation exists between a sound detected in an environment of the user by the audio system 114 and the change in the gaze point of the user). The user attention system 116 also may determine whether a user's attention has shifted based on additional factors detected by the eye tracking system 112 (e.g., based on whether each eye of the user has been closed for at least a threshold amount of time, whether a pupil size of each eye of the user has changed for at least a threshold amount of time, etc.). In various embodiments, the user attention system 116 also may determine a response to a shift in a user's attention. In such embodiments, the user attention system 116 may determine the response based on a reason that the user's attention shifted, a context of the user, a set of rules, and/or a set of preferences associated with the user. The response may recapture the user's attention, enhance/diminish or emphasize/de-emphasize a sound detected by the audio system 114 or improve its intelligibility, or recommunicate media to the user that the user may have missed. Based on the response, the user attention system 116 may then communicate instructions to the audio system 114 or another system or device coupled to or including the eye tracking system 112, the audio system 114, and/or the user attention system 116 for execution. The function of the user attention system 116 is further described below in conjunction with FIG. 4.

FIG. 1B is an additional block diagram of a system environment 100B in which an eye tracking system 112 operates, in accordance with one or more embodiments. The system environment 100B may be an artificial reality environment (e.g., a virtual reality environment, an augmented reality environment, a mixed reality environment, or some combination thereof). The system environment 100B shown in FIG. 1B includes a headset 110, an input/output (I/O) interface 105 that is coupled to a console 140, a network 130, and a mapping server 150. While FIG. 1B shows an example system environment 100B including one headset 110 and one I/O interface 105, in other embodiments, any number of these components may be included in the system environment 100B. For example, there may be multiple headsets 110 each having an associated I/O interface 105, with each headset 110 and I/O interface 105 communicating with the console 140. In alternative configurations, different and/or additional components may be included in the system environment 100B. Additionally, functionality described in conjunction with one or more of the components shown in FIG. 1B may be distributed among the components in a different manner than described in conjunction with FIG. 1B in some embodiments. For example, some or all of the functionality of the console 140 may be provided by the headset 110.

The headset 110 includes the eye tracking system 112, the audio system 114, and the user attention system 116 described above, as well as a display assembly 118, an optics block 120, one or more position sensors 122, and a depth camera assembly (DCA) 124. Similar to the embodiments described above in conjunction with FIG. 1A, in some embodiments, all or some of the functionality of the user attention system 116 may be provided by the eye tracking system 112 and/or the audio system 114. In embodiments in which all or some of the functionality of the console 140 is provided by the headset 110, the headset 110 also may include an application store 142, a tracking module 144, and/or an engine 146, which are further described below. In some embodiments, the headset 110 may be the headset 110A of FIG. 5A or the headset 110B of FIG. 5B, which are also further described below.

The display assembly 118 displays content to the user in accordance with data received from the console 140. The display assembly 118 displays the content using one or more display elements. For example, a display element may be an electronic display. In various embodiments, the display assembly 118 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, a display element may also include some or all of the functionality of the optics block 120.

The optics block 120 may magnify image light received from the electronic display, correct optical errors associated with the image light, and present the corrected image light to one or both eyeboxes of the headset 110. The eyebox is a location in space that an eye of a user occupies while wearing the headset 110. In various embodiments, the optics block 120 includes one or more optical elements. Example optical elements included in the optics block 120 include: an aperture, a Fresnel lens, a convex lens, a concave lens, a filter, a reflecting surface, or any other suitable optical element that affects image light. Moreover, the optics block 120 may include combinations of different optical elements. In some embodiments, one or more of the optical elements in the optics block 120 may have one or more coatings, such as partially reflective or anti-reflective coatings.

Magnification and focusing of the image light by the optics block 120 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 120 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 120 corrects the distortion when it receives image light from the electronic display generated based on the content.

The position sensor 122 is an electronic device that generates data indicating a position of the headset 110. The position sensor 122 generates one or more measurement signals in response to motion of the headset 110. Examples of a position sensor 122 include: one or more inertial measurement units (IMUs), one or more accelerometers, one or more gyroscopes, one or more magnetometers, another suitable type of sensor that detects motion, or some combination thereof. The position sensor 122 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 110 from the sampled data. For example, the IMU integrates the measurement signals received from the accelerometers over time to estimate a velocity vector and integrates the velocity vector over time to determine an estimated position of a reference point on the headset 110. The reference point is a point that may be used to describe the position of the headset 110. While the reference point may generally be defined as a point in space, in practice, the reference point is defined as a point within the headset 110.

The DCA 124 generates depth information for a portion of the local area. The DCA 124 includes one or more imaging devices and a DCA controller. The DCA 124 may also include an illuminator. Operation and structure of the DCA 124 is further described below with regard to FIG. 5A.

The I/O interface 105 is a device that allows a user to send action requests and receive responses from the console 140. An action request is a request to perform a particular action. For example, an action request may be an instruction to start or end capture of image or video data, or an instruction to perform a particular action within an application. The I/O interface 105 may include one or more input devices. Example input devices include: a keyboard, a mouse, a game controller, or any other suitable device for receiving action requests and communicating the action requests to the console 140. An action request received by the I/O interface 105 is communicated to the console 140, which performs an action corresponding to the action request. In some embodiments, the I/O interface 105 includes an IMU that captures calibration data indicating an estimated position of the I/O interface 105 relative to an initial position of the I/O interface 105. In some embodiments, the I/O interface 105 may provide haptic feedback to the user in accordance with instructions received from the console 140. For example, haptic feedback is provided when an action request is received, or the console 140 communicates instructions to the I/O interface 105 causing the I/O interface 105 to generate haptic feedback when the console 140 performs an action.

The console 140 provides content to the headset 110 for processing in accordance with information received from one or more of: the DCA 124, the headset 110, and the I/O interface 105. In the example shown in FIG. 1B, the console 140 includes the application store 142, the tracking module 144, and the engine 146. Some embodiments of the console 140 have different modules or components than those described in conjunction with FIG. 1B. Similarly, the functions further described below may be distributed among components of the console 140 in a different manner than described in conjunction with FIG. 1B. In some embodiments, the functionality discussed herein with respect to the console 140 may be implemented in the headset 110, or a remote system.

The application store 142 stores one or more applications for execution by the console 140. An application is a group of instructions that, when executed by a processor, generates content for presentation to the user. Content generated by an application may be in response to inputs received from the user via movement of the headset 110 or the I/O interface 105. Examples of applications include: gaming applications, conferencing applications, video playback applications, or other suitable applications.

The tracking module 144 tracks movements of the headset 110 or of the I/O interface 105 using information from the DCA 124, the one or more position sensors 122, or some combination thereof. For example, the tracking module 144 determines a position of a reference point of the headset 110 in a mapping of a local area based on information from the headset 110. The tracking module 144 may also determine positions of an object or a virtual object. Additionally, in some embodiments, the tracking module 144 may use portions of data indicating a position of the headset 110 from the position sensor 122 as well as representations of the local area from the DCA 124 to predict a future location of the headset 110. The tracking module 144 provides the estimated or predicted future position of the headset 110 or the I/O interface 105 to the engine 146.

The engine 146 executes applications and receives position information, acceleration information, velocity information, predicted future positions, or some combination thereof, of the headset 110 from the tracking module 144. Based on the received information, the engine 146 determines content to provide to the headset 110 for presentation to the user. For example, if the received information indicates that the user has looked to the left, the engine 146 generates content for the headset 110 that mirrors the user's movement in a virtual local area or in a local area augmenting the local area with additional content. Additionally, the engine 146 performs an action within an application executing on the console 140 in response to an action request received from the I/O interface 105 and provides feedback to the user that the action was performed. The provided feedback may be visual or audible feedback via the headset 110 or haptic feedback via the I/O interface 105.

The network 130 couples the headset 110 and/or the console 140 to the mapping server 150. The network 130 may include any combination of local area and/or wide area networks using both wireless and/or wired communication systems. For example, the network 130 may include the Internet, as well as mobile telephone networks. In one embodiment, the network 130 uses standard communications technologies and/or protocols. Hence, the network 130 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 130 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 may be represented using technologies and/or formats including image data in binary form (e.g. Portable Network Graphics (PNG)), hypertext markup language (HTML), extensible markup language (XML), etc. In addition, all or some of the links may be encrypted using conventional encryption technologies such as secure sockets layer (SSL), transport layer security (TLS), virtual private networks (VPNs), Internet Protocol security (IPsec), etc.

The mapping server 150 may include a database that stores a virtual model describing a plurality of spaces, wherein one location in the virtual model corresponds to a current configuration of a local area of the headset 110. The mapping server 150 receives, from the headset 110 via the network 130, information describing at least a portion of the local area and/or location information for the local area. For example, the audio system 114 may provide information describing at least a portion of the local area (e.g., from the DCA 124 and/or location information for the headset 110 from the position sensor 122). The user may adjust privacy settings to allow or prevent the headset 110 from transmitting information to the mapping server 150. The mapping server 150 determines, based on the received information and/or location information, a location in the virtual model that is associated with the local area of the headset 110. The mapping server 150 determines (e.g., retrieves) one or more acoustic parameters associated with the local area, based in part on the determined location in the virtual model and any acoustic parameters associated with the determined location. The mapping server 150 may transmit the location of the local area and any values of acoustic parameters associated with the local area to the headset 110. For example, the audio system 114 may request acoustic parameters from the mapping server 150 over the network 130 and the audio system 114 may then generate one or more sound filters using one or more of the acoustic parameters received from the mapping server 150, and use the sound filters to provide audio content to the user.

One or more components of the system environment 100B may contain a privacy module that stores one or more privacy settings for user data elements. The user data elements describe the user or the headset 110. For example, the user data elements may describe a physical characteristic of the user, an action performed by the user, a location of the user of the headset 110, a location of the headset 110, a head-related transfer function (HRTF) for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) may be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements may be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset 110 within the same local area as the user. If the user subsequently changes location, the entity with access to the user data element may lose access, while a new group of entities may gain access as they come within the threshold distance of the user.

The system environment 100B may include one or more authorization/privacy servers for enforcing privacy settings.

A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

FIG. 2 is a block diagram of an eye tracking system 112, in accordance with one or more embodiments. As described above, the eye tracking system 112 tracks a position and an orientation of one or more eyes of a user, which the eye tracking system 112 may then use to determine a gaze point of the user and to detect changes in the gaze point of the user. In the embodiment of FIG. 2, the eye tracking system 112 includes one or more imaging devices 210, a position and orientation tracking module 220, a gaze point determination module 230, and a data store 240. Some embodiments of the eye tracking system 112 may include different components than those described here. For example, in embodiments in which all or some of the functionality of the user attention system 116 is provided by the eye tracking system 112, the eye tracking system 112 also may include one or more components of the user attention system 116 described below in conjunction with FIG. 4. Similarly, in some embodiments, functions may be distributed among the components in a different manner than is described here.

The imaging device(s) 210 are configured to capture images and/or videos of one or more eyes of a user. For example, the imaging device(s) 210 may correspond to one or more cameras. In some embodiments, the imaging device(s) 210 may also include one or more illuminators that illuminate a user's eye(s) with an illumination pattern (e.g., structured light, glints, etc.). In such embodiments, the imaging device(s) 210 also may capture the illumination pattern on the eye(s) of the user. The imaging device(s) 210 may capture images and/or videos of a user's eye(s) using various techniques. For example, the imaging device(s) 210 may have night vision capability to capture images and/or videos of a user's eye(s) in low-light conditions. As an additional example, the imaging device(s) 210 may have thermal imaging technology to detect and measure infrared energy given off by different portions of a user's eye(s). In various embodiments, the imaging device(s) 210 also may capture images and/or videos of the eye(s) of multiple users. In some embodiments, images and/or videos of a user's eye(s) captured by the imaging device(s) 210 may be stored in the data store 240.

The position and orientation tracking module 220 tracks a position and an orientation of one or more eyes of a user. A position and an orientation of a user's eye(s) may be tracked by the position and orientation tracking module 220 with regard to a pupil of each eye based on images of the eye and/or illumination patterns on the eye captured by the imaging device(s) 210. For example, the position and orientation tracking module 220 may track a position and an orientation of a user's eyes based on images and/or videos of the eyes captured by the imaging device(s) 210 that depict locations of their pupils (e.g., in space and relative to each other and to other portions of each corresponding eye). In some embodiments, the position and orientation tracking module 220 also may track a shape of one or more pupils, a dilation of one or more pupils, a visibility of one or more pupils, or any other suitable attributes of the eye(s) of a user. In such embodiments, the position and orientation tracking module 220 also may detect changes in the shape of one or more pupils, changes in the dilation of one or more pupils, changes in the visibility of one or more pupils, etc. In embodiments in which images and/or videos of the eye(s) of multiple users are captured by the imaging device(s) 210, the position and orientation tracking module 220 also may track a position and an orientation of the eye(s) of each user. In some embodiments, information describing a position and an orientation of one or more eyes of a user may be stored in the data store 240.

The gaze point determination module 230 determines a gaze point of a user based on a position and an orientation of the eye(s) of the user tracked by the position and orientation tracking module 220. In some embodiments, the gaze point determination module 230 may determine a gaze point of a user based on one or more gaze lines for the eye(s) of the user. In such embodiments, the gaze point determination module 230 may determine a gaze line for each eye based on a position and an orientation of the eye. For example, the gaze point determination module 230 may determine that a gaze line for an eye of a user extends away from the user from the center of the eyeball through the center of the pupil. The gaze point determination module 230 may then use the gaze line(s) to determine the gaze point of the user. For example, the gaze point determination module 230 may determine that a gaze point of a user corresponds to a point in space at which gaze lines for the user's eyes intersect. Once the gaze point determination module 230 has determined a gaze point of a user, the gaze point determination module 230 may detect changes in the gaze point of the user. For example, if the gaze point determination module 230 determines that a gaze point of a user corresponds to a point in space at which gaze lines for the user's eyes intersect, the gaze point determination module 230 may detect a change in the gaze point of the user if an angle of one or more gaze lines changes. In embodiments in which the position and orientation tracking module 220 tracks a position and an orientation of the eye(s) of multiple users, the gaze point determination module 230 also may determine a gaze point of each user and detect changes in the gaze point of each user. In some embodiments, information describing a gaze point of a user may be stored in the data store 240.

The data store 240 stores eye tracking information captured, tracked, determined, or detected by other components of the eye tracking system 112. For example, the data store 240 may store eye tracking information for a user including images and/or videos of the user's eye(s), a position and an orientation of the user's eye(s), and gaze points of the user. In some embodiments, the eye tracking information may be stored in association with various types of information. For example, the eye tracking information for a user may be stored in association with information identifying the user, information describing a time associated with the information (e.g., a timestamp describing a time at which images and/or videos of the user's eyes were captured), information describing an action being performed by the user or an application being used by the user (e.g., when a gaze point of a user was determined), etc.

Figure 3:
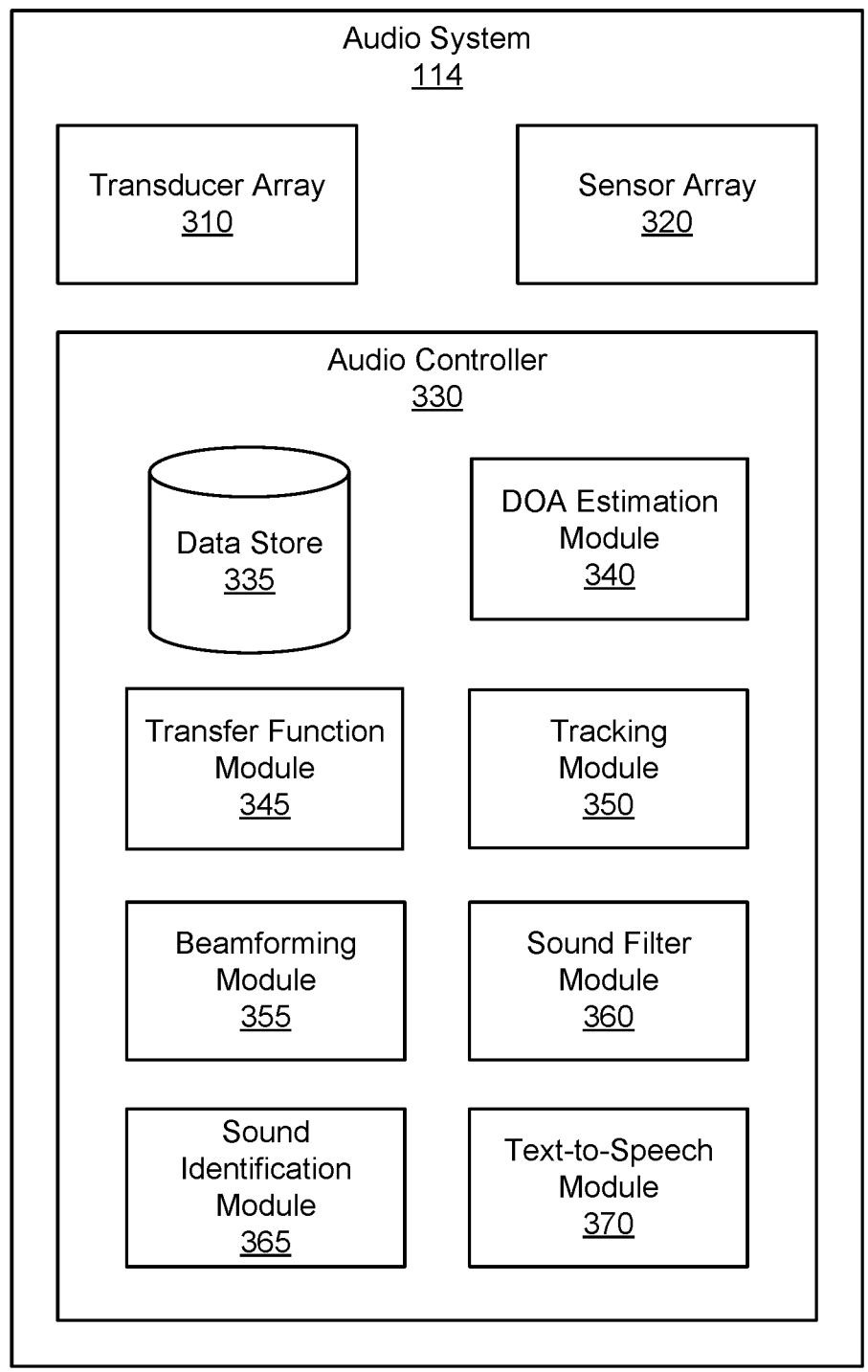
FIG. 3 is a block diagram of an audio system, in accordance with one or more embodiments.

FIG. 3 is a block diagram of an audio system 114, in accordance with one or more embodiments. As described above, the audio system 114 detects sounds in an environment of a user and communicates audio content to the user. As also described above, the audio system 114 also may determine a direction and/or a source of a sound, modify a sound, or replay audio data. A sound may be modified by enhancing, emphasizing, diminishing, or de-emphasizing it (e.g., by changing its volume, filtering it, changing its spatialization, etc.), by translating a language associated with it, etc. For example, to enhance or emphasize a sound it has detected, the audio system 114 may increase its volume relative to other sounds, filter out other sounds, and/or change its spatialization so that it appears to originate from a region closer to the user. As an additional example, to diminish or de-emphasize a sound it has detected, the audio system 114 may decrease its volume relative to other sounds, filter out the sound, and/or change its spatialization so that it appears to originate from a region further from the user. The audio system 114 may modify a sound based on a set of rules and/or a set of preferences associated with a user. In some embodiments, the audio system 114 also or alternatively may modify a sound based on instructions received from the user attention system 116. The audio system 114 also generates one or more acoustic transfer functions for a user and may then use the acoustic transfer function(s) to generate audio content for the user. In the embodiment of FIG. 3, the audio system 114 includes a transducer array 310, a sensor array 320, and an audio controller 330. Some embodiments of the audio system 114 include different components than those described here. For example, in embodiments in which all or some of the functionality of the user attention system 116 is provided by the audio system 114, the audio system 114 also may include one or more components of the user attention system 116 described below in conjunction with FIG. 4. Similarly, in some embodiments, functions may be distributed among the components in a different manner than is described here.

The transducer array 310 is configured to communicate audio content to a user. The transducer array 310 includes a plurality of transducers. A transducer is a device that provides audio content. For example, a transducer may be a speaker, a tissue transducer, some other device that provides audio content, or some combination thereof. A tissue transducer may be configured to function as a bone conduction transducer or a cartilage conduction transducer. The transducer array 310 may communicate audio content via air conduction (e.g., via one or more speakers), via bone conduction (via one or more bone conduction transducers), via a cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset 110, and may be configured to be behind the auricle coupled to a portion of the user's skull. The bone conduction transducer receives vibration instructions from the audio controller 330, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset 110, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate airborne acoustic pressure waves outside the ear canal, tissue-borne acoustic pressure waves that cause some portions of the ear canal to vibrate and thereby generate an airborne acoustic pressure wave within the ear canal, or some combination thereof. The generated airborne acoustic pressure waves propagate down the ear canal toward the ear drum.

The transducer array 310 generates audio content in accordance with instructions from the audio controller 330. In some embodiments, the audio content is spatialized. Spatialized audio content is audio content that appears to originate from a particular direction and/or a target region (e.g., an object in the local area and/or a virtual object). For example, spatialized audio content may make it appear as though sound is originating from a virtual singer across a room from the user. The transducer array 310 may be coupled to a wearable device (e.g., a headset 110). In alternative embodiments, the transducer array 310 may be a plurality of speakers that are separate from the wearable device (e.g., coupled to an external console 140).

The sensor array 320 detects sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors may be positioned on a headset 110, on a user (e.g., in an ear canal of the user), on a neckband, or some combination thereof. For example, an acoustic sensor may be a microphone, a vibration sensor, an accelerometer, or any combination thereof. In some embodiments, the sensor array 320 is configured to monitor the audio content generated by the transducer array 310 using at least some of the plurality of acoustic sensors. Increasing the number of sensors may improve the accuracy of information (e.g., directionality) describing a sound field produced by the transducer array 310 and/or sound from the local area.

The audio controller 330 controls operation of the audio system 114. In the embodiment of FIG. 3, the audio controller 330 includes a data store 335, a DOA estimation module 340, a transfer function module 345, a tracking module 350, a beamforming module 355, a sound filter module 360, a sound identification module 365, and a text-to-speech module 370. The audio controller 330 may be located inside a headset 110, in some embodiments. In some embodiments, the audio controller 330 may have different components than those described here. Similarly, functions may be distributed among the components in a different manner than described here. For example, some functions of the audio controller 330 may be performed external to a headset 110. The user may opt in to allow the audio controller 330 to transmit data captured by a headset 110 to systems external to the headset 110, and the user may select privacy settings controlling access to any such data.

The data store 335 stores data for use by the audio system 114. Data in the data store 335 may include sounds recorded in the local area of the audio system 114, audio content, head-related transfer functions (HRTFs), transfer functions for one or more sensors, array transfer functions (ATFs) for one or more of the acoustic sensors, sound source locations, a virtual model of the local area, direction of arrival estimates, sound filters, and any other suitable data that may be used by the audio system 114, or any combination thereof. In some embodiments, the data store 335 also may store information identifying various categories of sounds (e.g., dialogue, music, ambient noise, etc.). Information identifying a category of sound stored in the data store 335 may include various characteristics of sounds belonging to the category, such as their amplitudes, frequencies, wavelengths, whether they are continuous or intermittent, or any other suitable characteristics.

In some embodiments, the data store 335 also may store a set of rules and/or a set of preferences associated with a user that may be accessed by other components of the audio system 114. In embodiments in which the data store 335 includes a set of rules, the set of rules may describe how and when a sound detected by the audio system 114 should be modified (e.g., by enhancing or diminishing it, by emphasizing or de-emphasizing it, etc.) or replayed. For example, the set of rules may indicate that a sound detected by the audio system 114 should be modified if the user attention system 116 determines that the user's attention has shifted. In this example, the set of rules may indicate that the sound should be modified by enhancing or emphasizing it if it originates from an object of interest of the user. Continuing with this example, the set of rules also may indicate that the sound should be modified by diminishing or de-emphasizing it if it originates from a different object. In embodiments in which the data store 335 includes a set of preferences associated with a user, the set of preferences also may describe how and when a sound detected by the audio system 114 should be modified. For example, the set of preferences may indicate that a sound belonging to a music category should be enhanced between 6:00 PM and 9:00 PM when the user is at home or anytime the user is at a concert hall and that a sound belonging to an ambient noise category should be diminished when the user is in a car. In embodiments in which the data store 335 includes a set of preferences associated with a user, the set of preferences may be received from the user (e.g., via an input device included in an I/O interface 105).

The user may opt in to allow the data store 335 to record data captured by the audio system 114. In some embodiments, the audio system 114 may employ always on recording, in which the audio system 114 records all sounds detected by the audio system 114 in order to improve the experience for the user. The user may opt in or opt out to allow or prevent the audio system 114 from recording, storing, or transmitting the recorded data to other entities. In embodiments in which the data store 335 records data captured by the audio system 114, the data may be stored in association with various types of information, such as a time indicating when it was captured (e.g., in a timestamp), information identifying a user, etc. Furthermore, the audio system 114 subsequently may replay some or all of the data (e.g., when the user attention system 116 determines a user's attention has shifted or upon receiving a request from the user to replay the data).

The DOA estimation module 340 is configured to localize sound sources in the local area based in part on information from the sensor array 320. Localization is a process of determining where sound sources are located relative to the user. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some embodiments, the DOA analysis may include any suitable algorithm for analyzing a surrounding acoustic environment in which the audio system 114 is located. For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squares (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine the DOA.

In some embodiments, the DOA estimation module 340 may also determine the DOA with respect to an absolute position of the audio system 114 within the local area. The position of the sensor array 320 may be received from an external system, such as some other component of a headset 110, a console 140 (e.g., an artificial reality console 140), a mapping server 150, a position sensor 122, etc. The external system may create a virtual model of the local area, in which the local area and the position of the audio system 114 are mapped. The received position information may include a location and/or an orientation of some or all of the audio system 114 (e.g., of the sensor array 320). The DOA estimation module 340 may update the estimated DOA based on the received position information.

The transfer function module 345 is configured to generate one or more acoustic transfer functions. Generally, a transfer function is a mathematical function giving a corresponding output value for each possible input value. Based on parameters of the detected sounds, the transfer function module 345 generates one or more acoustic transfer functions associated with the audio system 114. The acoustic transfer functions may be array transfer functions (ATFs), head-related transfer functions (HRTFs), other types of acoustic transfer functions, or some combination thereof.

An ATF includes a number of transfer functions that characterize a relationship between a sound source and a corresponding sound received by the acoustic sensors in the sensor array 320. Accordingly, for a sound source, there is a corresponding transfer function for each of the acoustic sensors in the sensor array 320. Note that the sound source may be, for example, someone or something generating sound in the local area, the user, or one or more transducers of the transducer array 310. The ATF for a particular sound source location relative to the sensor array 320 may differ from user to user due to a user's anatomy (e.g., ear shape, shoulders, etc.) that affects the sound as it travels to the user's ears. Accordingly, the ATFs of the sensor array 320 are personalized for each user.

In some embodiments, the transfer function module 345 determines one or more HRTFs for a user. The HRTF characterizes how an ear receives a sound from a point in space. The HRTF for a particular source location relative to a user is unique to each ear of the user (and is unique to the user) due to the user's anatomy (e.g., ear shape, shoulders, etc.) that affects the sound as it travels to the user's ears. In some embodiments, the transfer function module 345 may determine HRTFs for the user using a calibration process. In various embodiments, the transfer function module 345 may provide information about the user to a remote system. In such embodiments, the remote system may determine a set of HRTFs that are customized to the user (e.g., using machine learning) and provide the customized set of HRTFs to the audio system 114. In some embodiments, the user may adjust privacy settings to allow or prevent the transfer function module 345 from providing the information about the user to any remote systems.

The tracking module 350 is configured to track locations of one or more sound sources. The tracking module 350 may do so by comparing current DOA estimates with each other and with a stored history of previous DOA estimates. In some embodiments, the tracking module 350 may recalculate DOA estimates on a periodic schedule, such as once per second, or once per millisecond. The tracking module 350 may compare the current DOA estimates with previous DOA estimates, and in response to a change in a DOA estimate for a sound source, the tracking module 350 may determine that the sound source moved. In some embodiments, the tracking module 350 may detect a change in location based on visual information received from a headset 110 or some other external source. The tracking module 350 may track the movement of one or more sound sources over time. The tracking module 350 may store values for a number of sound sources and a location of each sound source at each point in time. In response to a change in a value of the number or locations of the sound sources, the tracking module 350 may determine that a sound source moved. The tracking module 350 may calculate an estimate of the localization variance. The localization variance may be used as a confidence level for each determination of a change in movement.

The beamforming module 355 is configured to process one or more ATFs to selectively emphasize sounds from sound sources within a certain area while de-emphasizing sounds from other areas. In analyzing sounds detected by the sensor array 320, the beamforming module 355 may combine information from different acoustic sensors to emphasize sound associated from a particular region of the local area while de-emphasizing sound that is from outside of the region. The beamforming module 355 may isolate an audio signal associated with sound from a particular sound source from other sound sources in the local area (e.g., based on different DOA estimates from the DOA estimation module 340 and the tracking module 350). The beamforming module 355 may thus selectively analyze discrete sound sources in the local area. In some embodiments, the beamforming module 355 may enhance a signal from a sound source. For example, the beamforming module 355 may apply sound filters which eliminate signals above, below, or between certain frequencies. Signal enhancement acts to enhance sounds associated with a given identified sound source relative to other sounds detected by the sensor array 320. In some embodiments, the beamforming module 355 may emphasize and/or de-emphasize sounds detected by the sensor array 320 from different areas within the local area based on a set of rules and/or a set of preferences associated with a user stored in the data store 335 and/or based on instructions received from the user attention system 116. For example, based on instructions received from the user attention system 116, the beamforming module 355 may execute the instructions to process one or more ATFs to increase or decrease a volume of a sound or apply one or more filters to the sound. The modified sound subsequently may be communicated to the user via the transducer array 310.

The sound filter module 360 determines sound filters for the transducer array 310. In some embodiments, the sound filters cause the audio content to be spatialized, such that the audio content appears to originate from a target region. The sound filter module 360 may use HRTFs and/or acoustic parameters to generate the sound filters. The acoustic parameters describe acoustic properties of the local area. For example, the acoustic parameters may include a reverberation time, a reverberation level, a room impulse response, etc. In some embodiments, the sound filter module 360 calculates one or more of the acoustic parameters. In various embodiments, the sound filter module 360 requests the acoustic parameters from a mapping server 150. The sound filter module 360 provides the sound filters to the transducer array 310. In some embodiments, the sound filters may cause positive or negative amplification of sounds as a function of frequency. In some embodiments, the sound filter module 360 may provide sound filters that modify one or more sounds detected by the sensor array 320 based on a set of rules and/or a set of preferences associated with a user stored in the data store 335 and/or based on instructions received from the user attention system 116. For example, based on a set of rules and a set of preferences associated with a user stored in the data store 335, the sound filter module 360 may execute instructions to provide sound filters to the transducer array 310 to change a spatialization of a sound. The modified sound subsequently may be communicated to the user via the transducer array 310.

The sound identification module 365 may identify a category (e.g., dialogue, music, ambient noise, etc.) to which a sound detected by the sensor array 320 belongs. The sound identification module 365 may do so based on information stored in the data store 335. For example, the sound identification module 365 may compare characteristics of a sound (e.g., its amplitude, frequency, wavelength, whether it is continuous or intermittent, etc.) to characteristics of different categories of sounds stored in the data store 335 and identify the sound based on the comparison. In some embodiments, the sound identification module 365 may identify a category to which a sound belongs using natural language processing (NLP), statistical models, neural networks, or any other suitable technique or combination of techniques. For example, the sound identification module 365 may access a machine learning model that is trained to predict a category to which a sound belongs. In this example, the sound identification module 365 may apply the model to characteristics of a sound and receive an output corresponding to a predicted category to which the sound belongs.

The text-to-speech module 370 may send instructions to the transducer array 310 to present sound to a user based on text data. The text data may be received from the user attention system 116, from a device or a system coupled to or including the eye tracking system 112, the audio system 114, and/or the user attention system 116 (e.g., a smartphone executing an audio book application), etc. For example, the text-to-speech module 370 may receive text data from the user attention system 116, in which the text data corresponds to a translation of a sound detected by the sensor array 320 belonging to a dialogue category. In this example, if the sound detected by the sensor array 320 includes multiple phrases in the Spanish language, the text-to-speech module 370 may receive text data from the user attention system 116 corresponding to an English translation of the phrases. Continuing with this example, the text-to-speech module 370 may send instructions to the transducer array 310 to present sound to the user, such that the transducer array 310 communicates the English translation of the phrases to the user.

Figure 4:
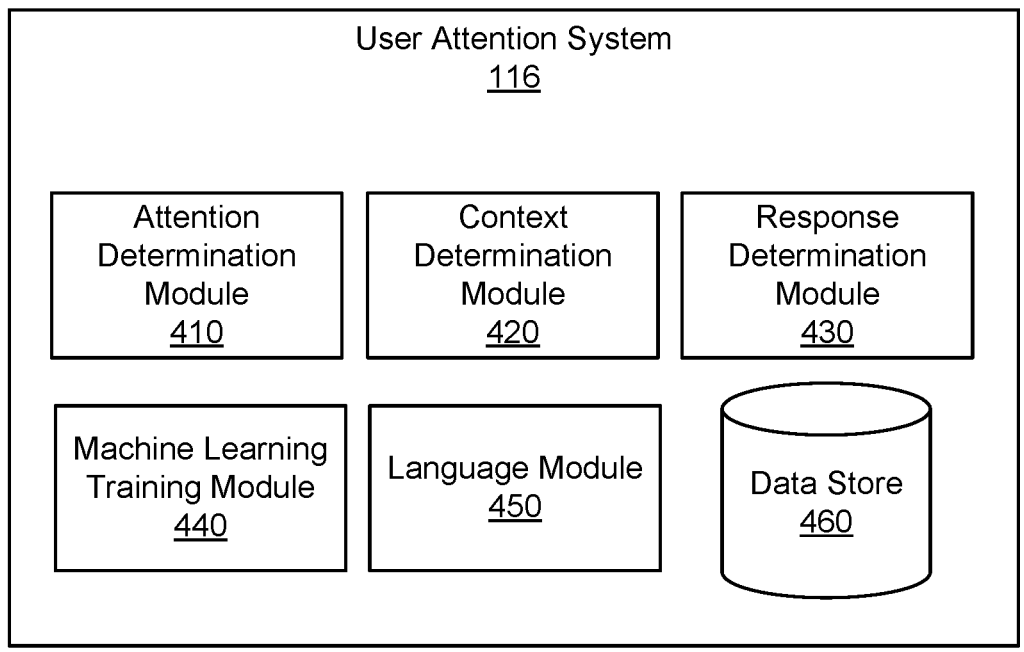
FIG. 4 is a block diagram of a user attention system, in accordance with one or more embodiments.

FIG. 4 is a block diagram of a user attention system 116, in accordance with one or more embodiments. As described above, the user attention system 116 may determine whether a user's attention has shifted and may do so based on information received from the eye tracking system 112 and/or the audio system 114. As also described above, in some embodiments, the user attention system 116 also may determine a reason that a user's attention has shifted and a response to the shift. In the embodiment of FIG. 4, the user attention system 116 includes an attention determination module 410, a context determination module 420, a response determination module 430, a machine learning training module 440, a language module 450, and a data store 460. In some embodiments, the user attention system 116 may include different components than those described here. Similarly, in some embodiments, functions may be distributed among the components in a different manner than is described here.

The attention determination module 410 may determine an object of interest of a user. In some embodiments, the attention determination module 410 may do so based on information received from the eye tracking system 112 and/or the audio system 114. In various embodiments, the attention determination module 410 also may determine an object of interest of a user based on a set of rules stored in the data store 460. For example, suppose that the audio system 114 has detected a sound belonging to a dialogue category in an environment of a user and has determined the source of the sound to be a person. In this example, the attention determination module 410 may determine that the person is an object of interest of the user if information describing the source of the sound received from the audio system 114 and information describing the gaze point of the user received from the eye tracking system 112 are within a threshold distance of each other (e.g., a threshold distance specified by a rule stored in the data store 460). In various embodiments, the attention determination module 410 may determine an object of interest of a user based on information received from one or more eye tracking systems 112. In the above example, the attention determination module 410 alternatively may determine that the person is the object of interest of the user if the gaze points of multiple users are within the threshold distance of each other and match the location of the person. In this example, the gaze points of the users may be received from a single eye tracking system 112 being used by all of the users or from an eye tracking system 112 being used by each user.

The attention determination module 410 may determine whether a user's attention has shifted (e.g., away from an object of interest). The attention determination module 410 may do so based on information received from the eye tracking system 112 and/or the audio system 114. In some embodiments, the attention determination module 410 may determine whether a correlation exists between a sound detected in an environment of a user by the audio system 114 and a change in a gaze point of the user detected by the eye tracking system 112 and the attention determination module 410 may then determine whether a user's attention has shifted based on whether the correlation exists. In such embodiments, the attention determination module 410 may determine whether the correlation exists based on a time at which the sound was detected, a time at which the change in the gaze point of the user was detected, a direction from which the sound was detected, a direction of the change in the gaze point of the user, or any other suitable types of information. For example, suppose that the attention determination module 410 has determined an object of interest of a user is a person, such that the person matches the user's gaze point. In this example, suppose also that the audio system 114 then detects a sound of a door slamming in the environment of the user and the eye tracking system 112 detects a change in the user's gaze point. In the above example, the attention determination module 410 may determine a correlation exists between the sound and the change in the gaze point of the user because the change in the gaze point of the user was detected within a threshold amount of time of detecting the sound and the gaze point moved away from the person towards a direction from which the sound was detected. In this example, the attention determination module 410 may then determine that the user's attention has shifted based on the existence of the correlation. In various embodiments, the attention determination module 410 also may determine whether a user's attention has shifted based on a set of rules stored in the data store 460. In the above example, a set of rules stored in the data store 460 may describe a threshold difference between a time at which the sound was detected and a time at which the change in the gaze point of the user was detected and a threshold difference between a direction from which the sound was detected and another direction of the change in the gaze point of the user for a correlation to exist.

In some embodiments, the attention determination module 410 also may determine whether a user's attention has shifted based on other types of information received from the eye tracking system 112. Examples of such information include a change in a gaze point of the user, a change in a shape of a pupil of the user, a change in a dilation of a pupil of the user, a change in a visibility of a pupil of the user, or any other suitable attributes related to the eye(s) of the user. For example, the attention determination module 410 may determine that a user's attention has shifted if information received from the eye tracking system 112 indicates that the user's gaze point has shifted to something other than an object of interest. As an additional example, the attention determination module 410 may determine that a user's attention has shifted if information received from the eye tracking system 112 indicates that a pupil of each eye has not been visible for at least a threshold amount of time. As yet another example, the attention determination module 410 may determine that a user's attention has shifted if information received from the eye tracking system 112 indicates that a pupil size of each eye of the user has increased for at least a threshold amount of time and a gaze point of the user cannot be determined.

In various embodiments, the attention determination module 410 also may determine whether a user's attention has shifted based on other types of information associated with the user (e.g., biomarkers, vital signs, etc.) received from the eye tracking system 112, the audio system 114, or one or more devices or systems coupled to or including the eye tracking system 112, the audio system 114, and/or the user attention system 116. Examples of such devices/systems include a wearable device (e.g., a fitness monitor, an activity tracker, a smartwatch, a heart rate monitor, etc.), a workout machine, or any other suitable types of devices/systems. For example, the attention determination module 410 may determine that a user's attention has shifted if information received from a smartwatch indicates that the user has fallen asleep. In this example, the information may include a heart rate of the user that is less than a threshold rate, a respiratory rate of the user that is less than a threshold rate, and movement information for the user indicating that the user has not moved for at least a threshold amount of time.

In various embodiments, the attention determination module 410 may determine whether a user's attention has shifted using one or more machine learning models that are trained to predict a likelihood that the user's attention has shifted. In such embodiments, the machine learning model(s) may include one or more regression models, support vector machines, neural networks, or any other suitable machine learning model(s). The attention determination module 410 may access the model(s) and apply the model(s) to a set of attributes associated with a user that may change over time to predict the likelihood that the user's attention has shifted. Examples of such attributes include a gaze point of the user, a position and/or an orientation of the user's eye(s), one or more of the user's biomarkers and/or vital signs, information describing sounds or objects detected in an environment of the user, or any other suitable attributes associated with a user. For example, the attention determination module 410 may apply the machine learning model(s) to a set of attributes associated with a user including a position and an orientation of each eye of the user before and after a change in a gaze point of the user, an amount of time that each eye was in each position and orientation, and the gaze point of the user before and after the change. In this example, the set of attributes also may include a time at which a sound in an environment of the user was detected by the audio system 114 prior to detecting the change in the gaze point of the user, a category to which the sound belongs, a direction from which the sound was detected, and a time at which the change in the gaze point of the user was detected. The attention determination module 410 may then receive an output from the machine learning model(s) indicating a predicted likelihood that the user's attention has shifted. In the above example, the output may correspond to a percentage that is proportional to a likelihood that the attention of the user has shifted. The attention determination module 410 may then determine whether the user's attention has shifted based on the predicted likelihood. Continuing with the above example, the attention determination module 410 may determine that the user's attention has shifted if the predicted likelihood is at least a threshold likelihood.

In various embodiments, if the attention determination module 410 determines that a user's attention has shifted, the attention determination module 410 also may determine a reason that the user's attention has shifted. The attention determination module 410 may determine the reason based on information received from the eye tracking system 112, the audio system 114, or one or more devices or systems coupled to or including the eye tracking system 112, the audio system 114, and/or the user attention system 116. In various embodiments, the attention determination module 410 also may do so based on a set of rules stored in the data store 460. For example, suppose that the attention determination module 410 identifies an object of interest of a user and then determines that the user's attention has shifted based on a correlation that exists between a sound detected in an environment of the user by the audio system 114 and a change in a gaze point of the user detected by the eye tracking system 112. In this example, based on a rule stored in the data store 460, the attention determination module 410 may determine that the reason for the shift in the user's attention was the sound. Alternatively, in the above example, suppose that the attention determination module 410 does not determine that a correlation exists between the sound and the change in the gaze point of the user, but information received from the eye tracking system 112 indicates that the gaze point of the user has changed. In this example, based on a rule stored in the data store 460, the attention determination module 410 may determine that the user's attention has shifted because of an object that now matches the user's gaze point. As an additional example, if information received from the eye tracking system 112 indicates that a pupil of each of a user's eyes has not been visible for at least a threshold amount of time, based on a rule stored in the data store 460, the attention determination module 410 may determine that the user's attention has shifted because the user is falling asleep. As yet another example, if information received from the eye tracking system 112 indicates that a pupil size of each eye of the user has changed for at least a threshold amount of time and a gaze point of the user cannot be determined, based on a rule stored in the data store 460, the attention determination module 410 may determine that the user's attention has shifted because the user has zoned out.

The context determination module 420 determines a context of a user. A context of a user may include an environment of the user (e.g., a geographic location, indoors/outdoors, an office, a vehicle, etc.), an action being performed by the user (e.g., driving, participating in a meeting, attending a concert, studying, sleeping, etc.), a time associated with the user, etc. The context determination module 420 may determine a context of a user based on information associated with a context of the user received from the eye tracking system 112, the audio system 114, one or more systems or devices including or coupled to the eye tracking system 112, the audio system 114, and/or the user attention system 116, via manual input from the user (e.g., via an I/O interface 105), etc. In various embodiments, the context determination module 420 also may do so based on a set of rules and/or a set of preferences associated with a user stored in the data store 460. For example, suppose that the eye tracking system 112 is included in a headset 110 and that the headset 110 is coupled to a mobile device executing a navigation application. In this example, the context determination module 420 may access video data captured by cameras on the headset 110, information describing the navigation application, and GPS coordinates associated with the mobile device. Continuing with this example, the context determination module 420 may then determine that the user is driving based on the video data, the information describing the navigation application, changing GPS coordinates associated with the mobile device, and one or more rules stored in the data store 460 describing a context corresponding to driving.

In some embodiments, the context determination module 420 may determine a context of a user using one or more machine learning models that are trained to predict the context of the user. In such embodiments, the context determination module 420 may access the model(s) and apply the model(s) to a set of attributes associated with a context of the user. The context determination module 420 may then receive an output from the machine learning model(s) indicating a predicted context of the user and may determine the context of the user based on the output. In some embodiments, the output may be associated with a percentage that is proportional to a likelihood that a predicted context is associated with the user. The context determination module 420 may then determine the context of the user based on the likelihood. For example, the context determination module 420 may apply the machine learning model(s) to a set of attributes associated with a context of a user corresponding to information identifying various categories of sounds detected by the audio system 114, GPS coordinates for a library received from a smartphone coupled to the audio system 114, and a silenced notifications setting enabled on the smartphone. In this example, if the output of the model(s) indicates there is a 93% likelihood that the user is studying in the library, a 5% likelihood that the user is taking a nap in a car parked by the library, and a 2% likelihood that the user is eating in a park close to the library, the context determination module 420 may determine that a context of a user corresponds to studying in the library since it is associated with the highest likelihood.

In some embodiments, once the attention determination module 410 determines a user's attention has shifted, the response determination module 430 may determine a response to the shift. In such embodiments, the response may recapture the user's attention, improve communication of a sound detected by the audio system 114 to the user, recommunicate media to the user that the user may have missed, etc. For example, a response may be to replay audio data via the audio system 114 or to replay video data via a device (e.g., a smartphone) coupled to or including the eye tracking system 112, the audio system 114, and/or the user attention system 116. As an additional example, a response may be to modify a sound detected by the audio system 114 and communicate the modified sound to a user via the audio system 114 or to provide a translation associated with a sound detected by the audio system 114 and communicate the translation to the user (e.g., as subtitles via a headset 110). As yet another example, a response may be to provide haptic feedback to a user (e.g., via a mobile device coupled to the eye tracking system 112, the audio system 114, and/or the user attention system 116). Once the response determination module 430 determines a response, it may then communicate instructions associated with the response to the eye tracking system 112, the audio system 114, or one or more devices including or coupled to the eye tracking system 112, the audio system 114, and/or the user attention system 116 for execution.

In various embodiments, the response determination module 430 may determine a response to a shift in a user's attention based on a reason that the user's attention shifted, a context of the user determined by the context determination module 420, a set of rules stored in the data store 460, and/or a set of preferences associated with the user stored in the data store 460, as described below. For example, suppose that the context determination module 420 determines that a user is driving while listening to music and the attention determination module 410 determines that the user's attention has shifted because the user is falling asleep. In this example, based on the determination that the user is falling asleep while driving and a set of preferences associated with the user, the response determination module 430 may determine a response to the shift in the user's attention corresponding to increasing a volume of the music and providing haptic feedback via a smartwatch coupled to the eye tracking system 112, the audio system 114, and/or the user attention system 116. As an additional example, suppose that the context determination module 420 determines that a user is participating in a video conference in an office and the attention determination module 410 determines that the user's attention has shifted due to a sound of an air conditioning system detected by the audio system 114. In this example, based on the determination that the user is being distracted by an ambient sound while participating in a video conference and a set of rules, the response determination module 430 may determine a response corresponding to enhancing sounds associated with the video conference and diminishing the sound of the air conditioner. As yet another example, suppose that the context determination module 420 determines that a user is listening to an audio book at home and the attention determination module 410 determines that the user's attention has shifted because the user is falling asleep. In this example, based on the determination that the user is falling asleep while listening to an audio book and a set of preferences associated with the user, the response determination module 430 may determine a response corresponding to pausing the audio book until the attention determination module 410 determines that the user is awake (e.g., once it receives information from the eye tracking system 112 indicating a gaze point of the user has been determined). In this example, the response also may include replaying the audio book from the location within the audio book that was playing when the attention determination module 410 determined that the user was falling asleep.

In embodiments in which the attention determination module 410 determines whether a user's attention has shifted using one or more machine learning models, the model(s) may be trained by the machine learning training module 440 based on historical information including attributes associated with the user that may change over time. Examples of such attributes include a gaze point of the user, a position and/or an orientation of the user's eye(s), one or more of the user's biomarkers and/or vital signs, information describing sounds or objects detected in an environment of the user, or any other suitable attributes associated with the user. The historical information may be received from the eye tracking system 112, the audio system 114, one or more devices or systems coupled to or including the eye tracking system 112, the audio system 114, and/or the user attention system 116, via manual input from the user, etc. For example, the machine learning training module 440 may receive a set of attributes associated with multiple changes in gaze points for a user (e.g., a position and an orientation of each eye of the user before and after each change, an amount of time that each eye was in the position and orientation before and after each change, and the gaze point of the user before and after each change). In this example, the set of attributes also may include a time at which a sound in an environment of the user was detected by the audio system 114 prior to detecting each change in the gaze point of the user, a category to which the sound belongs, a direction from which the sound was detected, and a time at which each change in the gaze point of the user was detected. Continuing with this example, for each change in gaze point, the machine learning training module 440 may receive a label indicating whether the attention of the user was shifted (e.g., using a calibration process) and the machine learning training module 440 may then train the machine learning model(s) based on the set of attributes and the label for each change in gaze point for the user. A machine learning model may be specific to one or more users. For example, a machine learning model may be specific to one or more users if historical information describing attributes associated with the user(s) was used to train the model. Once trained, the machine learning model(s) may be stored in the data store 460. A machine learning model may be retrained periodically or as new training data becomes available. For example, a machine learning model may be retrained each time a user performs a calibration process and the retrained model may then be stored in the data store 460.

Similarly, in embodiments in which the context determination module 420 determines a context of a user using one or more machine learning models, the model(s) may be trained by the machine learning training module 440 based on historical information including attributes associated with a context of the user. Examples of such attributes include information describing an environment of the user (e.g., a geographic location, indoors/outdoors, an office, a vehicle, etc.), an action being performed by the user (e.g., driving, participating in a meeting, attending a concert, studying, sleeping, etc.), a time associated with the user, etc. The historical information may be received from the eye tracking system 112, the audio system 114, one or more devices or systems coupled to or including the eye tracking system 112, the audio system 114, and/or the user attention system 116, via manual input from the user, etc. For example, the machine learning training module 440 may receive a set of attributes associated with multiple contexts of a user (e.g., positions and orientations of each eye of the user, different gaze points of the user, and times associated with the positions, orientations, and gaze points). In this example, the set of attributes also may include various sounds in an environment of the user detected by the audio system 114. In the above example, if the eye tracking system 112, the audio system 114, and/or the user attention system 116 are included in or coupled to any devices, the set of attributes also may include applications executed by the devices, settings associated with the devices, geographic locations associated with the devices, etc. Continuing with this example, for each context, the machine learning training module 440 may receive a label indicating the context of the user (e.g., via manual inputs from the devices) and the machine learning training module 440 may then train the machine learning model(s) based on the set of attributes and the label for each context of the user. A machine learning model may be specific to one or more users. For example, a machine learning model may be specific to one or more users if historical information describing attributes associated with the contexts of the user(s) was used to train the model. Once trained, the machine learning model(s) may be stored in the data store 460. A machine learning model may be retrained periodically or as new training data becomes available. For example, a machine learning model may be retrained each time a user provides a manual input indicating their context and the retrained model may then be stored in the data store 460.

The language module 450 may identify a language associated with a sound belonging to a dialogue category detected by the audio system 114. In some embodiments, the language module 450 may identify a language associated with a sound based on information stored in the data store 460. The language module 450 may do so by comparing words or phrases included in the sound to words or phrases stored in the data store 460 and identifying the language associated with the sound based on the comparison. For example, if the language module 450 determines that a phrase included in a sound detected by the audio system 114 matches a phrase in the French language stored in the data store 460, the language module 450 may identify the language associated with the sound as French. The language module 450 also or alternatively may identify a language associated with a sound using natural language processing (NLP), statistical models, neural networks, or any other suitable technique or combination of techniques.

In various embodiments, the language module 450 also may translate a language associated with a sound detected by the audio system 114. In such embodiments, the language module 450 may do so if the language associated with the sound is different from a language associated with a user. In the above example, the language module 450 may compare French with a preferred language associated with a user (e.g., stored in the data store 460). Continuing with this example, if the preferred language associated with the user is not French, the language module 450 may translate the phrase to the preferred language associated with the user and the language module 450 may then communicate instructions to the audio system 114 to modify the sound based on the translation (e.g., by reading the translation). In embodiments in which the language module 450 translates a language associated with a sound detected by the audio system 114, the language module 450 may do so based on words or phrases stored in the data store 460, using machine translation (MT), or using any other suitable technique or combination of techniques. The translation may then be presented to the user audibly (e.g., as speech) or visually (e.g., as subtitles). In embodiments in which the translation is presented visually, the language module 450 may send the translation to a device including one or more display elements (e.g., a headset 110, a mobile device, etc.) that may be used to present the translation to the user.

In some embodiments, the language module 450 also may determine an intelligibility of a sound. In such embodiments, the language module 450 may make the determination based on a language associated with the sound. For example, suppose that the language module 450 has identified a language associated with a sound detected by the audio system 114. In this example, the language module 450 may determine an intelligibility of the sound based on various attributes of the sound (e.g., a volume of the sound, an enunciation of the words or phrases included in the sound, etc.). Continuing with this example, if the sound is not very intelligible, the language module 450 may then communicate instructions to the audio system 114 to modify the sound in a way that improves its intelligibility (e.g., by emphasizing the sound and de-emphasizing other sounds detected by the audio system 114, by spatializing audio content so that the sound appears to originate from a region closer to the user, etc.).

The data store 460 may store various types of data used by the user attention system 116. In some embodiments, the data store 460 may store a set of rules that may be accessed by the attention determination module 410. In such embodiments, the set of rules may describe how the attention determination module 410 may determine an object of interest of a user, how the attention determination module 410 may determine a user's attention has shifted, a reason for the user's shift in attention, etc. For example, the set of rules may describe how the attention determination module 410 determines a correlation exists between a sound detected in an environment of a user by the audio system 114 and a change in a gaze point of the user detected by the eye tracking system 112. In this example, the set of rules may describe a threshold difference between a time at which the sound was detected and a time at which the change in the gaze point of the user was detected and a threshold difference between a direction from which the sound was detected and another direction of the change in the gaze point of the user for a correlation to exist.

In some embodiments, the data store 460 also may store a set of rules that may be accessed by the context determination module 420. In such embodiments, the set of rules may describe how the context determination module 420 may determine a context of a user based on information describing an environment of the user, an action being performed by the user, a time associated with the user, etc. For example, the set of rules may describe how the context determination module 420 may determine a context of a user corresponding to participating in a video conference at the user's office based on a combination of information. In this example, the information may include sounds belonging to a dialogue category detected by the audio system 114, GPS coordinates associated with a mobile device coupled to the eye tracking system 112 and the audio system 114, information describing a conferencing application executing on the mobile device, and a Wi-Fi network to which the mobile device is connected.

In various embodiments, the data store 460 also may store a set of rules that may be accessed by the response determination module 430. In such embodiments, the set of rules may describe how the response determination module 430 may determine a response to a shift in a user's attention (e.g., based on the user's context and a reason for the shift in the user's attention). Furthermore, the set of rules may indicate if and when a sound detected by the audio system 114 should be modified (e.g., by enhancing or emphasizing it, by diminishing or de-emphasizing it, by translating a language associated with the sound to another language, etc.) or replayed. For example, the set of rules may indicate that a sound detected by the audio system 114 should be modified if the user attention determination module 410 determines that a user's attention has shifted. In this example, the set of rules may indicate that the sound should be modified by enhancing or emphasizing it (e.g., by increasing its volume or changing its spatialization so that it appears to originate from a region closer to the user) if it originates from an object of interest of the user. Continuing with this example, the set of rules also may indicate that the sound should be modified by diminishing or de-emphasizing it (e.g., by decreasing its volume or changing its spatialization so that it appears to originate from a region further from the user) if it originates from a different object. As an additional example, the set of rules may indicate that dialogue in a language other than a preferred language associated with a user should be translated to dialogue in the preferred language associated with the user.

The data store 460 also may store various additional types of information used by the user attention system 116. In some embodiments, the data store 460 also may store one or more machine learning model(s) trained by the machine learning training module 440. In embodiments in which the data store 460 stores a machine learning model specific to a user, the model may be stored in association with information identifying the user (e.g., a username or other unique identifier associated with the user). In various embodiments, the data store 460 also may store a vocabulary associated with one or more languages. For example, the data store 460 may store various words or phrases in multiple languages, such that the data store 460 includes one or more translations for each word or phrase. In some embodiments, the data store 460 also may store a set of preferences associated with a user. For example, the data store 460 may include a set of preferences associated with a user including a preferred language associated with the user. In various embodiments, the set of preferences may describe how or when a sound detected by the audio system 114 should be modified. In the above example, the set of preferences also may include preferred responses to shifts in the user's attention based on a context associated with the user (e.g., an environment of the user, an action being performed by the user, a time associated with the user, etc.). In this example, the set of preferences also may include a preferred method by which media in a language other than the user's preferred language is to be communicated to the user (e.g., as a speech translation and/or as subtitles). As an additional example, a set of preferences associated with a user may indicate that a sound belonging to a music category should be enhanced on weekends and that a sound belonging to an ambient noise category should be diminished when the user is in their office. In embodiments in which the data store 460 includes a set of preferences associated with a user, the set of preferences may be received from the user (e.g., via an input device included in an I/O interface 105).

Figure 5A:
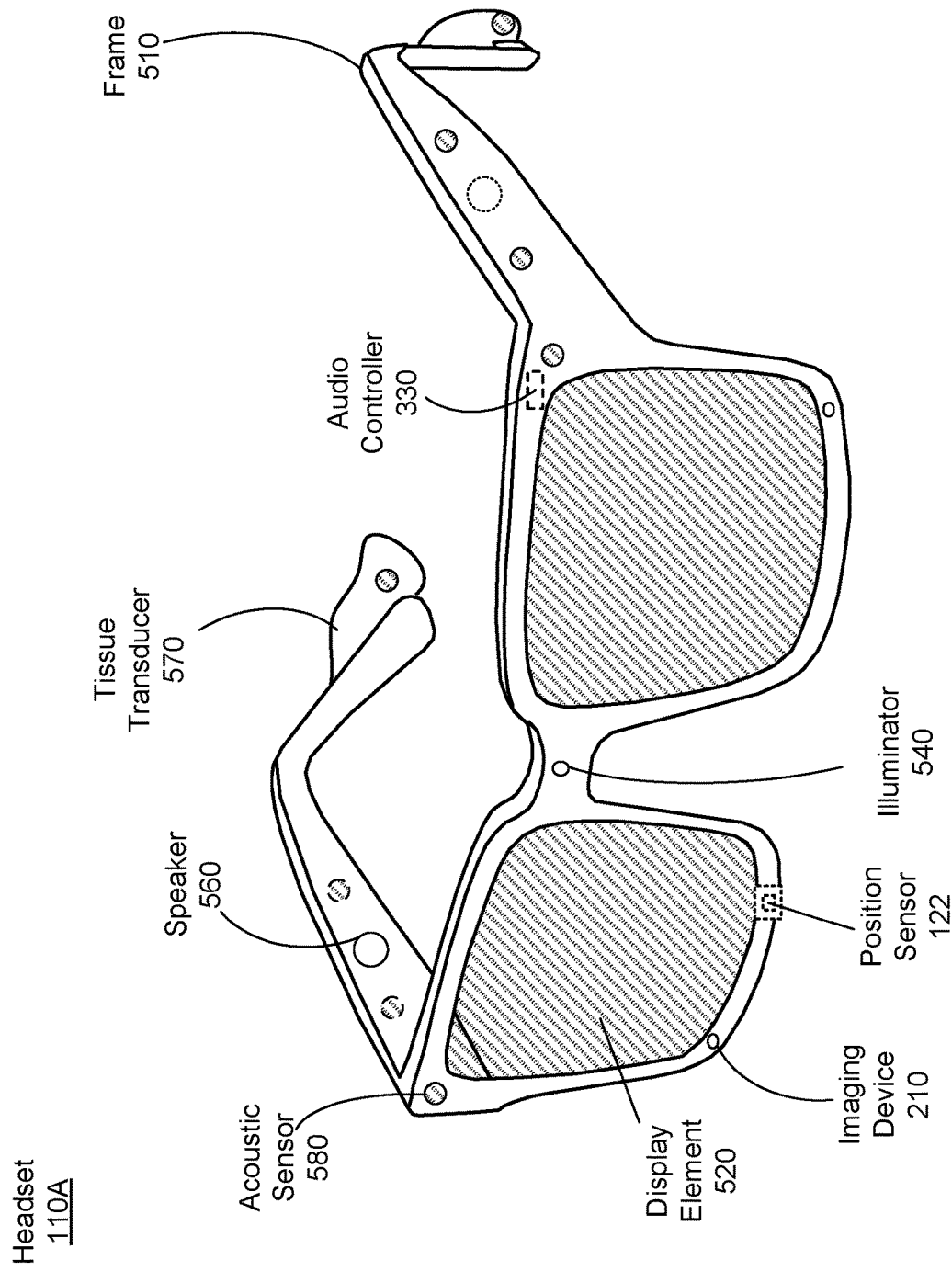
FIG. 5A is a perspective view of a headset implemented as an eyewear device, in accordance with one or more embodiments.

FIG. 5A is a perspective view of a headset 110A implemented as an eyewear device, in accordance with one or more embodiments. In some embodiments, the eyewear device is a near eye display (NED). In general, the headset 110A may be worn on the face of a user such that content (e.g., media content) is presented using the display assembly 118 and/or the audio system 114. However, the headset 110A may also be used such that media content is presented to a user in a different manner. Examples of media content presented by the headset 110A include one or more images, video, audio, or some combination thereof. The headset 110A includes a frame 510, and may include, among other components, the display assembly 118 including one or more display elements 520, the DCA 124 (not shown), the audio system 114, and the position sensor 122. While FIG. 5A illustrates the components of the headset 110A in example locations on the headset 110A, the components may be located elsewhere on the headset 110A, on a peripheral device paired with the headset 110A, or some combination thereof. Similarly, there may be more or fewer components on the headset 110A than what is shown in FIG. 5A.

The frame 510 holds the other components of the headset 110A. The frame 510 includes a front portion that holds the one or more display elements 520 and end pieces (e.g., temples) that attach to a head of the user. The front portion of the frame 510 bridges the top of a nose of the user. The length of the end pieces may be adjustable (e.g., adjustable temple length) to fit different users. The end pieces may also include a portion that curls behind the ear of the user (e.g., a temple tip, an ear piece, etc.).

The one or more display elements 520 provide light to a user wearing the headset 110A. As illustrated, the headset 110A includes a display element 520 for each eye of a user. In some embodiments, a display element 520 generates image light that is provided to an eyebox of the headset 110A. For example, a display element 520 may be a waveguide display. A waveguide display includes a light source (e.g., a two-dimensional source, one or more line sources, one or more point sources, etc.) and one or more waveguides. Light from the light source is in-coupled into the one or more waveguides, which outputs the light in a manner such that there is pupil replication in an eyebox of the headset 110A. In-coupling and/or out-coupling of light from the one or more waveguides may be done using one or more diffraction gratings. In some embodiments, the waveguide display includes a scanning element (e.g., a waveguide, a mirror, etc.) that scans light from the light source as it is in-coupled into the one or more waveguides. Note that in some embodiments, one or both of the display elements 520 are opaque and do not transmit light from a local area around the headset 110A. The local area is the area surrounding the headset 110A. For example, the local area may be a room that a user wearing the headset 110A is inside, or the user wearing the headset 110A may be outside and the local area is an outside area. In this context, the headset 110A generates VR content. Alternatively, in some embodiments, one or both of the display elements 520 are at least partially transparent, such that light from the local area may be combined with light from the one or more display elements 520 to produce AR and/or MR content.

In some embodiments, a display element 520 does not generate image light, and instead is a lens that transmits light from the local area to the eyebox. For example, one or both of the display elements 520 may be a lens without correction (non-prescription) or a prescription lens (e.g., single vision, bifocal, trifocal, or progressive) to help correct for defects in a user's eyesight. In some embodiments, the display element 520 may be polarized and/or tinted to protect the user's eyes from the sun.

In some embodiments, the display element 520 may include an additional optics block 120 (not shown). The optics block 120 may include one or more optical elements (e.g., lens, Fresnel lens, etc.) that direct light from the display element 520 to the eyebox. For example, the optics block 120 may correct for aberrations in some or all of the image content, magnify some or all of the image, or some combination thereof.

The DCA 124 determines depth information for a portion of a local area surrounding the headset 110A. The DCA 124 includes one or more imaging devices 210 and a DCA controller (not shown in FIG. 5A), and may also include an illuminator 540. In some embodiments, the illuminator 540 illuminates a portion of the local area with light. For example, the light may be structured light (e.g., a dot pattern, bars, etc.) in the infrared (IR), IR flash for time-of-flight, etc. In some embodiments, the one or more imaging devices 210 capture images of the portion of the local area that include the light from the illuminator 540. As illustrated, FIG. 5A shows a single illuminator 540 and two imaging devices 210. In alternate embodiments, there is no illuminator 540 and at least two imaging devices 210.

The DCA controller computes depth information for the portion of the local area using the captured images and one or more depth determination techniques. For example, the depth determination technique may be direct time-of-flight (ToF) depth sensing, indirect ToF depth sensing, structured light, passive stereo analysis, active stereo analysis (uses texture added to the scene by light from the illuminator 540), some other technique to determine depth of a scene, or some combination thereof. In some embodiments, the DCA 124 includes the eye tracking system 112 that determines eye tracking information (e.g., a position and an orientation of one or both eyes of a user within their respective eyeboxes).

As described above, the audio system 114 detects sounds and communicates audio content to a user and includes the transducer array 310, the sensor array 320, and the audio controller 330. However, in other embodiments, the audio system 114 may include different and/or additional components. Similarly, in some embodiments, functionality described with reference to the components of the audio system 114 may be distributed among the components in a different manner than is described here. For example, some or all of the functions of the audio controller 330 may be performed by a remote server.

The transducer array 310 presents sound to a user. The transducer array 310 includes a plurality of transducers. A transducer may be a speaker 560 or a tissue transducer 570 (e.g., a bone conduction transducer or a cartilage conduction transducer). Although the speakers 560 are shown exterior to the frame 510, the speakers 560 may be enclosed in the frame 510. In some embodiments, instead of individual speakers 560 for each ear, the headset 110A includes a speaker array comprising multiple speakers 560 integrated into the frame 510 to improve directionality of presented audio content. The tissue transducer 570 couples to the head of the user and directly vibrates tissue (e.g., bone or cartilage) of the user to generate sound. The number and/or locations of transducers may be different from what is shown in FIG. 5A.

The sensor array 320 detects sounds within the local area of the headset 110A. The sensor array 320 includes a plurality of acoustic sensors 580. An acoustic sensor 580 captures sounds emitted from one or more sound sources in the local area (e.g., a room). Each acoustic sensor 580 is configured to detect sound and convert the detected sound into an electronic format (analog or digital). The acoustic sensors 580 may be acoustic wave sensors, microphones, sound transducers, or similar sensors that are suitable for detecting sounds.

In some embodiments, one or more acoustic sensors 580 may be placed in an ear canal of each ear (e.g., acting as binaural microphones). In some embodiments, the acoustic sensors 580 may be placed on an exterior surface of the headset 110A, placed on an interior surface of the headset 110A, separate from the headset 110A (e.g., part of some other device), or some combination thereof. The number and/or locations of acoustic sensors 580 may be different from what is shown in FIG. 5A. For example, the number of acoustic detection locations may be increased to increase the amount of audio information collected and the sensitivity and/or accuracy of the information. The acoustic detection locations may be oriented such that the acoustic sensors 580 are able to detect sounds in a wide range of directions surrounding the user wearing the headset 110A.

The audio controller 330 processes information from the sensor array 320 that describes sounds detected by the sensor array 320. The audio controller 330 may comprise a processor and a computer-readable storage medium. The audio controller 330 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 560, or some combination thereof.

The position sensor 122 generates one or more measurement signals in response to motion of the headset 110A. The position sensor 122 may be located on a portion of the frame 510 of the headset 110A. The position sensor 122 may include an IMU. Examples of position sensor 122 include: one or more accelerometers, one or more gyroscopes, one or more magnetometers, another suitable type of sensor that detects motion, a type of sensor used for error correction of the IMU, or some combination thereof. The position sensor 122 may be located external to the IMU, internal to the IMU, or some combination thereof.

In some embodiments, the headset 110A may provide for simultaneous localization and mapping (SLAM) for a position of the headset 110A and updating of a model of the local area. For example, the headset 110A may include a passive camera assembly (PCA) that generates color image data. The PCA may include one or more RGB cameras that capture images of some or all of the local area. In some embodiments, some or all of the imaging devices 210 of the DCA 124 may also function as the PCA. The images captured by the PCA and the depth information determined by the DCA 124 may be used to determine parameters of the local area, generate a model of the local area, update a model of the local area, or some combination thereof. Furthermore, the position sensor 122 tracks the position (e.g., location and pose) of the headset 110A within the room.

Although not shown in FIG. 5A, the headset 110A also may include the user attention system 116. As described above, the user attention system 116 determines whether a user's attention has shifted. As also described above, the user attention system 116 may include an attention determination module 410, a context determination module 420, a response determination module 430, a machine learning training module 440, a language module 450, and a data store 460. However, in other embodiments, the user attention system 116 may include different and/or additional components. Similarly, in some embodiments, functionality described with reference to the components of the user attention system 116 may be distributed among the components in a different manner than is described here. For example, some or all of the functions of the user attention system 116 may be performed by a remote server. Additional details regarding the components of the headset 110A are discussed above in connection with FIG. 1B.

Figure 5B:
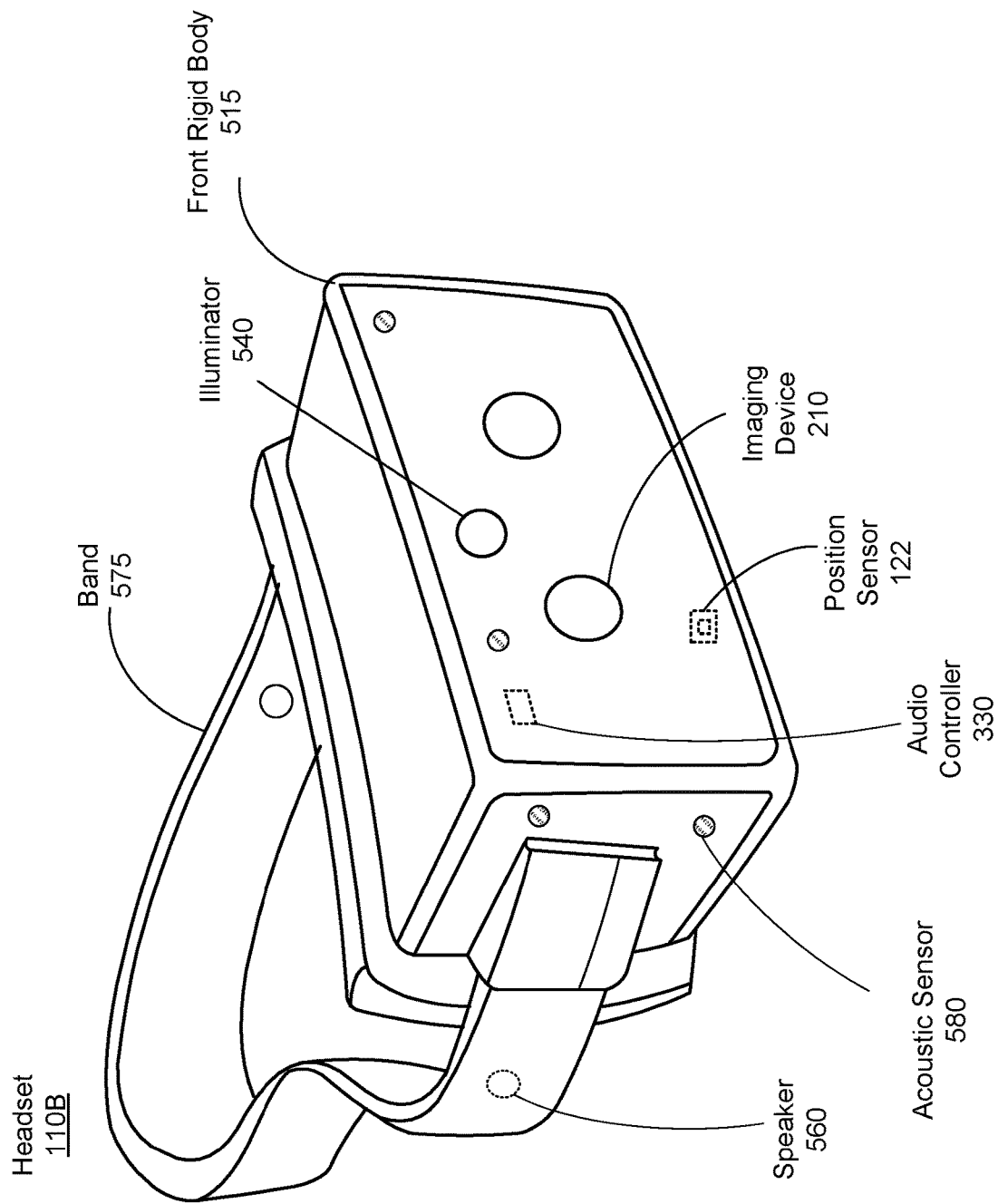
FIG. 5B is a perspective view of a headset implemented as a head-mounted display, in accordance with one or more embodiments.

FIG. 5B is a perspective view of a headset 110B implemented as a head-mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 515 and a band 575. The headset 110B includes many of the same components described above with reference to FIG. 5A (e.g., such as the eye tracking system 112, the audio system 114, and the user attention system 116), but modified to integrate with the HMD form factor. For example, the HMD includes the display assembly 118, the DCA 124 (which includes the eye tracking system 112), the audio system 114, the user attention system 116, and the position sensor 122. FIG. 5B shows the illuminator 540, a plurality of the speakers 560, a plurality of the imaging devices 210, a plurality of acoustic sensors 580, and the position sensor 122. The speakers 560 may be located in various locations, such as coupled to the band 575 (as shown), coupled to front rigid body 515, or may be configured to be inserted within the ear canal of a user.

Figure 6:
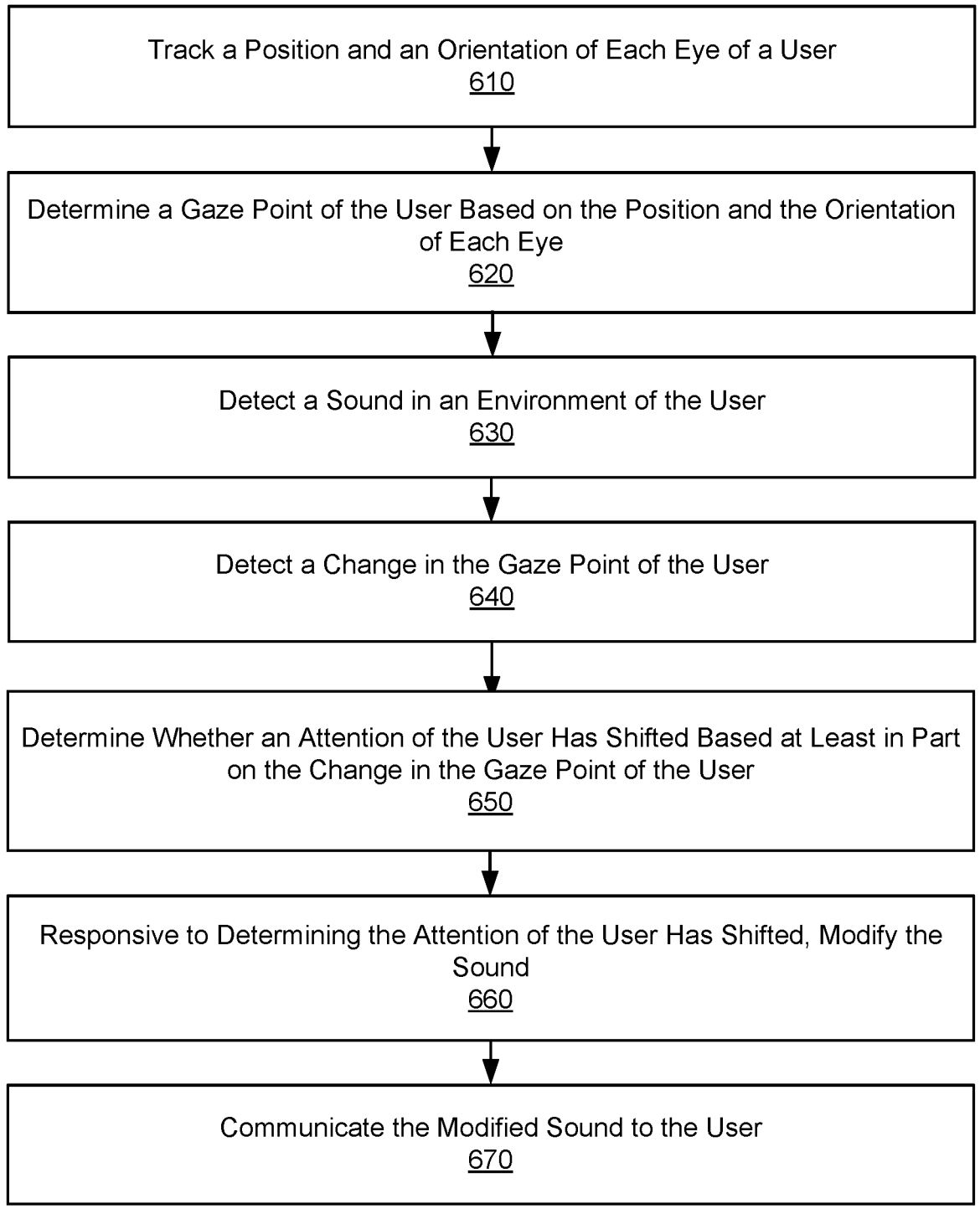
FIG. 6 is a flowchart of a method for modifying a sound in a user environment in response to determining a shift in user attention, in accordance with one or more embodiments.

FIG. 6 is a flowchart of a method for modifying a sound in a user environment in response to determining a shift in user attention, in accordance with one or more embodiments. The process shown in FIG. 6 may be performed by components of an eye tracking system (e.g., eye tracking system 112), an audio system (e.g., audio system 114), and a user attention system (e.g., user attention system 116). Other entities may perform some or all of the steps in FIG. 6 in other embodiments. Embodiments may include different and/or additional steps, or perform the steps in different orders.

The eye tracking system 112 tracks 610 (e.g., using the position and orientation tracking module 220) a position and an orientation of one or more eyes of a user. The position and the orientation of the user's eye(s) may be tracked 610 by the eye tracking system 112 with regard to a pupil of each eye based on images of the eye and/or illumination patterns on the eye captured by the eye tracking system 112 (e.g., using the imaging device(s) 210). For example, the eye tracking system 112 may track 610 the position and the orientation of the user's eyes based on images and/or videos of the eyes captured by the eye tracking system 112 that depict locations of their pupils (e.g., in space and relative to each other and to other portions of each corresponding eye). In some embodiments, the eye tracking system 112 also may track 610 a shape of one or more pupils, a dilation of one or more pupils, a visibility of one or more pupils, or any other suitable attributes of the eye(s) of the user. In such embodiments, the eye tracking system 112 also may detect changes in the shape of one or more pupils, changes in the dilation of one or more pupils, changes in the visibility of one or more pupils, etc. In various embodiments, images and/or videos of the eye(s) of multiple users in the local area are captured by the eye tracking system 112 (e.g., using the imaging device(s) 210) and the eye tracking system 112 also may track 610 a position and an orientation of the eye(s) of each user. In some embodiments, information describing a position and an orientation of one or more eyes of a user may be stored in the eye tracking system 112 (e.g., in the data store 240).

The eye tracking system 112 then determines 620 (e.g., using the gaze point determination module 230) a gaze point of the user based on the position and the orientation of the eye(s) of the user. In some embodiments, the eye tracking system 112 may determine 620 the gaze point of the user based on one or more gaze lines for the eye(s) of the user. In such embodiments, the eye tracking system 112 may determine a gaze line for each eye based on the position and the orientation of the eye. For example, the eye tracking system 112 may determine that a gaze line for an eye of the user extends away from the user from the center of the eyeball through the center of the pupil. The eye tracking system 112 may then use the gaze line(s) to determine 620 the gaze point of the user. For example, the eye tracking system 112 may determine 620 that the gaze point of the user corresponds to a point in space at which gaze lines for the user's eyes intersect. In embodiments in which the eye tracking system 112 tracks 610 a position and an orientation of the eye(s) of multiple users, the eye tracking system 112 also may determine 620 a gaze point of each user. In some embodiments, information describing a gaze point of a user may be stored in the eye tracking system 112 (e.g., in the data store 240).

The audio system 114 then detects 630 (e.g., using the sensor array 320) a sound in an environment of the user. In some embodiments, the environment of the user may include a portion of a physical environment surrounding the user or a "local area" of the user. In various embodiments, the environment of the user also may include a portion of a digital environment of the user (e.g., a virtual local area of the user). In some embodiments, the audio system 114 may employ always on recording, in which the audio system 114 records all sounds detected 630 by the audio system 114 in order to improve the experience for the user. In such embodiments, the sound may be stored by the audio system 114 (e.g., in the data store 335) in association with various types of information such as a time (e.g., a timestamp) indicating a time at which the sound was detected 630, information identifying the user, etc.

In various embodiments, once the audio system 114 detects 630 the sound, the audio system 114 may determine (e.g., using the DOA estimation module 340 and/or the tracking module 350 of the audio controller 330) a direction and/or a source of the sound. For example, the audio system 114 may localize the source of the sound in the local area by performing a DOA analysis. In this example, the audio system 114 may then track the movement of the source of the sound over time.

In some embodiments, the audio system 114 also may identify (e.g., using the sound identification module 365 of the audio controller 330) a category (e.g., dialogue, music, ambient noise, etc.) to which the sound belongs. In various embodiments, the audio system 114 may do so based on information stored in the audio system 114 (e.g., in the data store 335). For example, the audio system 114 may compare characteristics of the sound (e.g., its amplitude, frequency, wavelength, whether it is continuous or intermittent, etc.) to characteristics of different categories of sounds stored in the audio system 114 and identify the sound based on the comparison. In some embodiments, the audio system 114 may identify a category to which the sound belongs using natural language processing (NLP), statistical models, neural networks, or any other suitable technique or combination of techniques. For example, the audio system 114 may access a machine learning model that is trained to predict a category to which a sound belongs. In this example, the audio system 114 may apply the model to characteristics of the sound and receive an output corresponding to a predicted category to which the sound belongs.

In embodiments in which the sound detected 630 by the audio system 114 belongs to a dialogue category, the user attention system 116 may identify (e.g., using the language module 450) a language associated with the sound. In such embodiments, the user attention system 116 may identify the language based on information stored in the user attention system 116 (e.g., in the data store 460). The user attention system 116 may do so by comparing words or phrases included in the sound to words or phrases stored in the user attention system 116 and identifying the language associated with the sound based on the comparison. For example, if the user attention system 116 determines that a phrase included in the sound detected 630 by the audio system 114 matches a phrase in the French language stored in the user attention system 116, the user attention system 116 may identify the language associated with the sound as French. The user attention system 116 also or alternatively may identify a language associated with the sound using natural language processing (NLP), statistical models, neural networks, or any other suitable technique or combination of techniques.

In some embodiments, the user attention system 116 also may determine (e.g., using the language module 450) an intelligibility of the sound detected 630 by the audio system 114. In such embodiments, the user attention system 116 may make the determination based on a language associated with the sound. For example, suppose that the user attention system 116 has identified a language associated with the sound detected 630 by the audio system 114. In this example, the user attention system 116 may determine an intelligibility of the sound based on various attributes of the sound (e.g., a volume of the sound, an enunciation of the words or phrases included in the sound, etc.).

In various embodiments, the user attention system 116 also may determine (e.g., using the attention determination module 410) an object of interest of the user. In some embodiments, the user attention system 116 may do so based on information received from the eye tracking system 112 and/or the audio system 114. In various embodiments, the user attention system 116 also may determine the object of interest of the user based on a set of rules (e.g., stored in the data store 460). For example, suppose that a sound belonging to a dialogue category was previously detected 630 by the audio system 114 and that the audio system 114 determined the source of the sound to be a person. In this example, the user attention system 116 may determine that the person is an object of interest of the user if information describing the source of the sound received from the audio system 114 and information describing the gaze point of the user received from the eye tracking system 112 are within a threshold distance of each other (e.g., a threshold distance specified by one or more rules). In various embodiments, the user attention system 116 may determine the object of interest of the user based on information received from one or more eye tracking systems 112. In the above example, the user attention system 116 alternatively may determine that the person is the object of interest of the user if the gaze points of multiple users are within the threshold distance of each other and match the location of the person. In this example, the gaze points of the users may be received from a single eye tracking system 112 being used by all of the users or from an eye tracking system 112 being used by each user.

Once the eye tracking system 112 has determined 620 the gaze point of the user, the eye tracking system 112 may detect 640 (e.g., using the gaze point determination module 230) a change in the gaze point of the user. For example, if the eye tracking system 112 determines 620 that the gaze point of the user corresponds to a point in space at which gaze lines for the user's eyes intersect, the eye tracking system 112 may detect 640 the change in the gaze point of the user if an angle of one or more gaze lines changes. In embodiments in which the eye tracking system 112 determines 620 a gaze point of multiple users, the eye tracking system 112 also may detect (step 640) changes in the gaze point of each user.

Figure 7A:
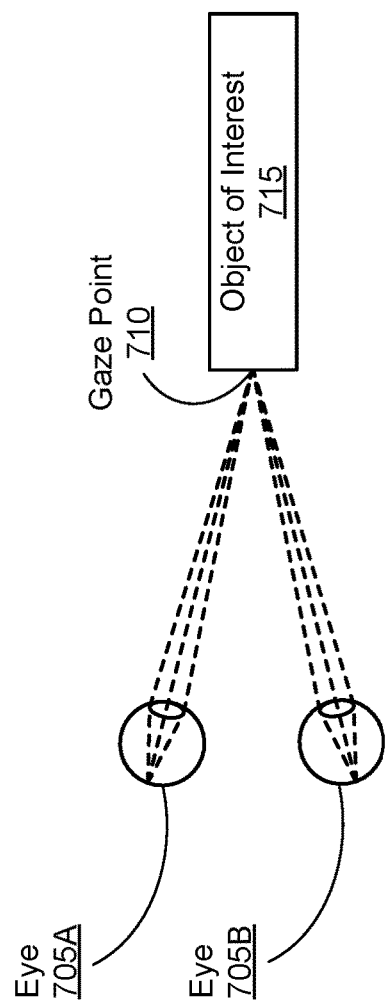
FIGS. 7A-7D illustrate examples of determining a shift in user attention based on a change in a gaze point of a user, in accordance with one or more embodiments.
Figure 7B:
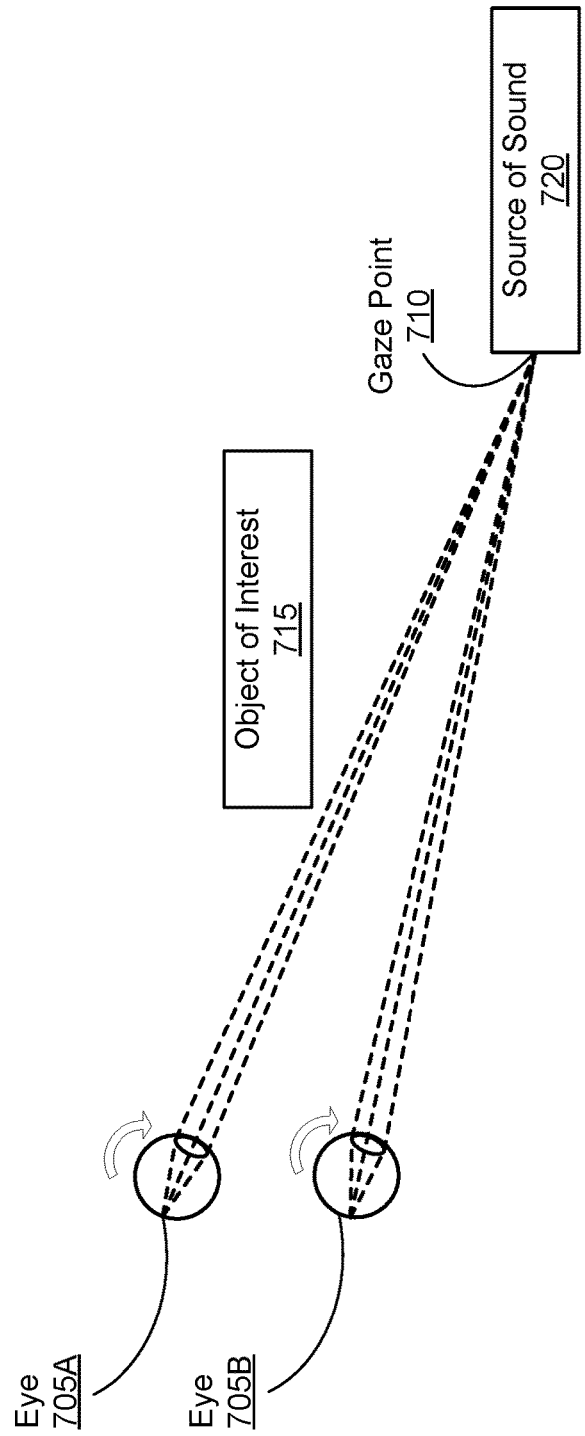

The user attention system 116 then determines 650 (e.g., using the attention determination module 410) whether the user's attention has shifted (e.g., away from the object of interest). The user attention system 116 may do so based on the change in the gaze point of the user. In some embodiments, the user attention system 116 determines (e.g., using the attention determination module 410) whether a correlation exists between the sound and the change in the gaze point of the user and the user attention system 116 may then determine 650 whether the user's attention has shifted based on whether the correlation exists. In such embodiments, the user attention system 116 may determine whether the correlation exists based on a time at which the sound was detected 630, a time at which the change in the gaze point of the user was detected 640, a direction from which the sound was detected 630, a direction of the change in the gaze point of the user, or any other suitable types of information. For example, as shown in FIG. 7A, suppose that the user attention system 116 has determined the object of interest 715 of the user is a person, such that the person matches the user's gaze point 710 (i.e., a point in space at which gaze lines for the user's eyes 705A-B intersect). In this example, suppose also that the audio system 114 then detects 630 the sound of a door slamming in the environment of the user and the eye tracking system 112 subsequently detects 640 the change in the user's gaze point 710. In the above example, the user attention system 116 may determine a correlation exists between the sound and the change in the gaze point 710 of the user because the change in the gaze point 710 of the user was detected 640 within a threshold amount of time of detecting 630 the sound and, as shown in FIG. 7B, the gaze point 710 moved away from the person towards the source of the sound 720. In this example, the user attention system 116 may then determine 650 that the user's attention has shifted based on the existence of the correlation. In various embodiments, the user attention system 116 also may determine 650 whether the user's attention has shifted based on a set of rules (e.g., stored in the data store 460). In the above example, one or more rules may describe a threshold difference between a time at which the sound was detected 630 and a time at which the change in the gaze point 710 of the user was detected 640 and a threshold difference between a direction from which the sound was detected 630 and another direction of the change in the gaze point 710 of the user for a correlation to exist.

Figure 7C:
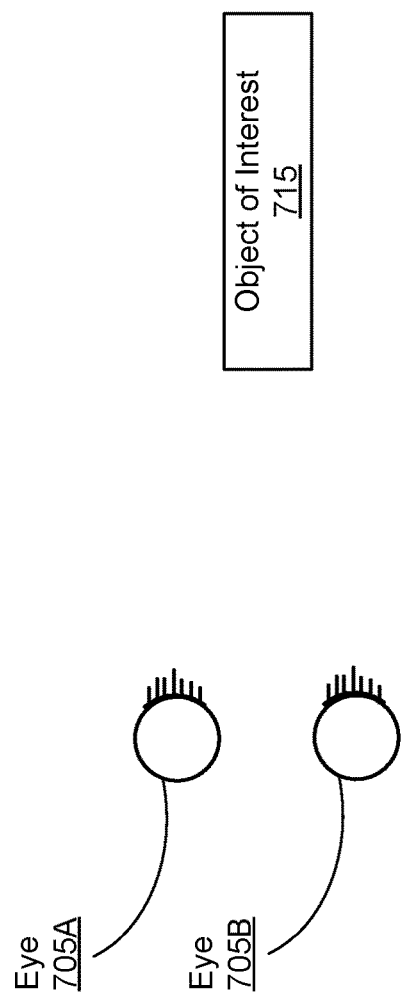
Figure 7D:
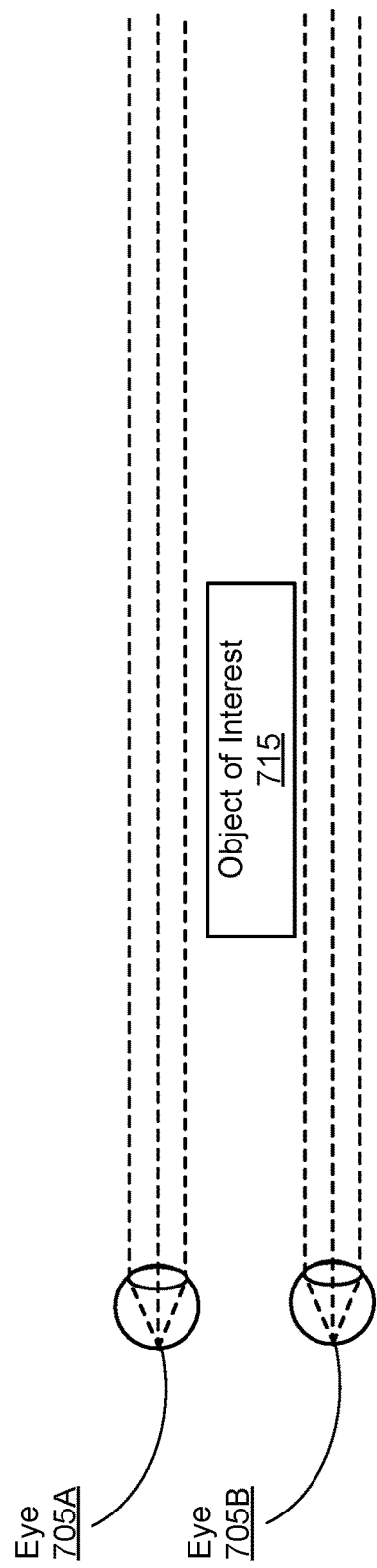

In some embodiments, the user attention system 116 also may determine 650 whether the user's attention has shifted based on other types of information received from the eye tracking system 112. Examples of such information include a change in the gaze point 710 of the user, a change in a shape of a pupil of the user, a change in a dilation of a pupil of the user, a change in a visibility of a pupil of the user, or any other suitable attributes related to the eye(s) 705A-B of the user. For example, the user attention system 116 may determine 650 that the user's attention has shifted if information received from the eye tracking system 112 indicates that the user's gaze point 710 has shifted to something other than the object of interest 715. As an additional example, as shown in FIG. 7C, the user attention system 116 may determine 650 that the user's attention has shifted if information received from the eye tracking system 112 indicates that the pupil of each eye 705A-B has not been visible for at least a threshold amount of time. As yet another example, as shown in FIG. 7D, the user attention system 116 may determine 650 that the user's attention has shifted if information received from the eye tracking system 112 indicates that a pupil size of each eye 705A-B of the user has increased for at least a threshold amount of time and a gaze point 710 of the user cannot be determined 620.

In various embodiments, the user attention system 116 also may determine 650 whether the user's attention has shifted based on other types of information associated with the user (e.g., biomarkers, vital signs, etc.) received from the eye tracking system 112, the audio system 114, or one or more devices or systems coupled to or including the eye tracking system 112, the audio system 114, and/or the user attention system 116. Examples of such devices/systems include a wearable device (e.g., a fitness monitor, an activity tracker, a smartwatch, a heart rate monitor, etc.), a workout machine, or any other suitable types of devices/systems. For example, the user attention system 116 may determine 650 that the user's attention has shifted if information received from a smartwatch indicates that the user has fallen asleep. In this example, the information may include a heart rate of the user that is less than a threshold rate, a respiratory rate of the user that is less than a threshold rate, and movement information for the user indicating that the user has not moved for at least a threshold amount of time.

In various embodiments, the user attention system 116 may determine 650 whether the user's attention has shifted using one or more machine learning models that are trained by the user attention system 116 (e.g., using the machine learning training module 440) to predict a likelihood that the user's attention has shifted. In such embodiments, the machine learning model(s) may include one or more regression models, support vector machines, neural networks, or any other suitable machine learning model(s). The user attention system 116 may access (e.g., using the attention determination module 410) the model(s) (e.g., from the data store 460) and apply (e.g., using the attention determination module 410) the model(s) to a set of attributes associated with the user that may change over time to predict the likelihood that the user's attention has shifted. Examples of such attributes include the gaze point 710 of the user, a position and/or an orientation of the user's eye(s) 705A-B, one or more of the user's biomarkers and/or vital signs, information describing sounds or objects detected 630 in the environment of the user, or any other suitable attributes associated with the user. For example, the user attention system 116 may apply the machine learning model(s) to a set of attributes associated with the user including a position and an orientation of each eye 705A-B of the user before and after the change in the gaze point 710 of the user, an amount of time that each eye 705A-B was in each position and orientation, and the gaze point 710 of the user before and after the change. In this example, the set of attributes also may include a time at which the sound in the environment of the user was detected 630 by the audio system 114 prior to detecting 640 the change in the gaze point 710 of the user, a category to which the sound belongs, a direction from which the sound was detected 630, and a time at which the change in the gaze point 710 of the user was detected 640. The user attention system 116 may then receive an output from the machine learning model(s) indicating a predicted likelihood that the user's attention has shifted. In the above example, the output may correspond to a percentage that is proportional to a likelihood that the attention of the user has shifted. The user attention system 116 may then determine 650 whether the user's attention has shifted based on the predicted likelihood. Continuing with the above example, the user attention system 116 may determine 650 that the user's attention has shifted if the predicted likelihood is at least a threshold likelihood.

In various embodiments, if the user attention system 116 determines 650 that the user's attention has shifted, the user attention system 116 also may determine (e.g., using the attention determination module 410) a reason that the user's attention has shifted. The user attention system 116 may determine the reason based on information received from the eye tracking system 112, the audio system 114, or one or more devices or systems coupled to or including the eye tracking system 112, the audio system 114, and/or the user attention system 116. In various embodiments, the user attention system 116 also may do so based on a set of rules (e.g., stored in the data store 460). For example, suppose that the user attention system 116 identifies the object of interest 715 of the user and then determines 650 that the user's attention has shifted based on a correlation that exists between the sound detected 630 in the environment of the user by the audio system 114 and the change in the gaze point 710 of the user detected 640 by the eye tracking system 112. In this example, based on a rule, the user attention system 116 may determine that the reason for the shift in the user's attention was the sound. Alternatively, in the above example, suppose that the user attention system 116 does not determine that a correlation exists between the sound and the change in the gaze point 710 of the user, but information received from the eye tracking system 112 indicates that the gaze point 710 of the user has changed. In this example, based on a rule, the user attention system 116 may determine 650 that the user's attention has shifted because of an object that now matches the user's gaze point 710. As an additional example, if information received from the eye tracking system 112 indicates that a pupil of each of the user's eyes 705A-B has not been visible for at least a threshold amount of time, based on a rule, the user attention system 116 may determine 650 that the user's attention has shifted because the user is falling asleep. As yet another example, if information received from the eye tracking system 112 indicates that a pupil size of each eye 705A-B of the user has changed for at least a threshold amount of time and the gaze point 710 of the user cannot be determined 620, based on a rule, the user attention system 116 may determine 650 that the user's attention has shifted because the user has zoned out.

In some embodiments, once the user attention system 116 determines 650 the user's attention has shifted, the user attention system 116 may determine (e.g., using the response determination module 430) a response to the shift. In such embodiments, the response may recapture the user's attention, improve communication of a sound detected 630 by the audio system 114 to the user, recommunicate media to the user that the user may have missed, etc. For example, the response may be to replay audio data via the audio system 114, or to replay video data via a device (e.g., a smartphone) coupled to or including the eye tracking system 112, the audio system 114, and/or the user attention system 116. As an additional example, the response may be to modify the sound detected 630 by the audio system 114 and communicate the modified sound to the user via the audio system 114 or to provide a translation associated with the sound detected 630 by the audio system 114 and communicate the translation to the user (e.g., as subtitles via a headset 110). As yet another example, the response may be to provide haptic feedback to the user (e.g., via a mobile device coupled to the eye tracking system 112, the audio system 114, and/or the user attention system 116). Once the user attention system 116 determines a response, it may then communicate instructions associated with the response to the eye tracking system 112, the audio system 114, or one or more devices including or coupled to the eye tracking system 112, the audio system 114, and/or the user attention system 116 for execution. For example, if the user attention system 116 has determined that the sound is not very intelligible, the user attention system 116 may then communicate instructions to the audio system 114 to modify the sound in a way that improves its intelligibility (e.g., by emphasizing the sound and de-emphasizing other sounds detected 630 by the audio system 114, by spatializing audio content so that the sound appears to originate from a region closer to the user, etc.).

In various embodiments, the user attention system 116 may determine the response to the shift in the user's attention based on a reason that the user's attention shifted, a context of the user, a set of rules (e.g., stored in the data store 460), and/or a set of preferences associated with the user (e.g., stored in the data store 460). A context of the user may include an environment of the user (e.g., a geographic location, indoors/outdoors, an office, a vehicle, etc.), an action being performed by the user (e.g., driving, participating in a meeting, attending a concert, studying, sleeping, etc.), a time associated with the user, etc. For example, suppose that the user attention system 116 has determined that the user is driving while listening to music and the user attention system 116 later determines 650 that the user's attention has shifted because the user is falling asleep. In this example, based on the determination that the user is falling asleep while driving and a set of preferences associated with the user, the user attention system 116 may determine a response to the shift in the user's attention corresponding to increasing a volume of the music and providing haptic feedback via a smartwatch coupled to the eye tracking system 112, the audio system 114, and/or the user attention system 116. As an additional example, suppose that the user attention system 116 has determined that the user is participating in a video conference in an office and the user attention system 116 later determines 650 that the user's attention has shifted due to a sound of an air conditioning system detected 630 by the audio system 114. In this example, based on the determination that the user is being distracted by an ambient sound while participating in a video conference and a set of rules, the user attention system 116 may determine a response corresponding to enhancing sounds associated with the video conference and diminishing the sound of the air conditioner. As yet another example, suppose that the user attention system 116 has determined that the user is listening to an audio book at home and the user attention system 116 then determines 650 that the user's attention has shifted because the user is falling asleep. In this example, based on the determination that the user is falling asleep while listening to an audio book and a set of preferences associated with the user, the user attention system 116 may determine a response corresponding to pausing the audio book until the user attention system 116 determines (e.g., using the attention determination module 410) that the user is awake (e.g., once it receives information from the eye tracking system 112 indicating a gaze point 710 of the user has been determined 620 again). In this example, the response also may include replaying the audio book from the location within the audio book that was playing when the user attention system 116 determined that the user was falling asleep.

In embodiments in which the user attention system 116 determines the response to the shift in the user's attention based on the context of the user, the user attention system 116 may determine (e.g., using the context determination module 420) the context of the user based on information associated with the context of the user received from the eye tracking system 112, the audio system 114, one or more systems or devices including or coupled to the eye tracking system 112, the audio system 114, and/or the user attention system 116, via manual input from the user (e.g., via an I/O interface 105), etc. In various embodiments, the user attention system 116 also may do so based on a set of rules and/or a set of preferences associated with the user (e.g., stored in the data store 460). For example, suppose that the eye tracking system 112 is included in a headset 110 and that the headset 110 is coupled to a mobile device executing a navigation application. In this example, the user attention system 116 may access video data captured by cameras on the headset 110, information describing the navigation application, and GPS coordinates associated with the mobile device. Continuing with this example, the user attention system 116 may then determine that the user is driving based on the video data, the information describing the navigation application, changing GPS coordinates associated with the mobile device, and one or more rules describing a context corresponding to driving.

In some embodiments, the user attention system 116 may determine the context of the user using one or more machine learning models that are trained by the user attention system 116 (e.g., using the machine learning training module 440) to predict the context of the user. In such embodiments, the user attention system 116 may access (e.g., using the context determination module 420) the model(s) (e.g., from the data store 460) and apply (e.g., using the context determination module 420) the model(s) to a set of attributes associated with the context of the user. The user attention system 116 may then receive an output from the machine learning model(s) indicating a predicted context of the user and may determine the context of the user based on the output. In some embodiments, the output may be associated with a percentage that is proportional to a likelihood that a predicted context is associated with the user. The user attention system 116 may then determine the context of the user based on the likelihood. For example, the user attention system 116 may apply the machine learning model(s) to a set of attributes associated with the context of the user corresponding to information identifying various categories of sounds detected 630 by the audio system 114, GPS coordinates for a library received from a smartphone coupled to the audio system 114, and a silenced notifications setting enabled on the smartphone. In this example, if the output of the model(s) indicates there is a 93% likelihood that the user is studying in the library, a 5% likelihood that the user is taking a nap in a car parked by the library, and a 2% likelihood that the user is eating in a park close to the library, the user attention system 116 may determine that the context of a user corresponds to studying in the library since it is associated with the highest likelihood.

As described above, in various embodiments, the response to the shift in the user's attention determined by the user attention system 116 may include providing a translation associated with the sound detected 630 by the audio system 114. In such embodiments, the user attention system 116 may translate (e.g., using the language module 450) a language associated with the sound if the language associated with the sound is different from a language associated with the user. For example, if the user attention system 116 has identified a language associated with the sound as French, the user attention system 116 may compare French with a preferred language associated with the user (e.g., stored in the data store 460). Continuing with this example, if the preferred language associated with the user is not French, the user attention system 116 may translate the phrase to the preferred language associated with the user and the user attention system 116 may then communicate instructions to the audio system 114 (e.g., to the text-to-speech module 370 of the audio controller 330) to modify the sound based on the translation (e.g., by reading the translation). In embodiments in which the user attention system 116 translates a language associated with the sound detected 630 by the audio system 114, the user attention system 116 may do so based on words or phrases stored in the user attention system 116 (e.g., in the data store 460), using machine translation (MT), or using any other suitable technique or combination of techniques.

Referring back to FIG. 6, responsive to determining 650 the attention of the user has shifted, the audio system 114 may modify 660 (e.g., using the audio controller 330) the sound. The sound may be modified 660 by enhancing, emphasizing, diminishing, or de-emphasizing it (e.g., by changing its volume, filtering it, changing its spatialization, etc.), by translating a language associated with it, etc. For example, suppose that the user attention system 116 does not determine that a correlation exists between the sound and the change in the gaze point 710 of the user, but information received from the eye tracking system 112 indicates that the gaze point 710 of the user has changed for at least a threshold amount of time. In this example, if the user attention system 116 determines that the source of the sound 720 is a new object of interest 715, to enhance or emphasize the sound, the audio system 114 may increase its volume relative to other sounds, filter out other sounds, or change its spatialization so that it appears to originate from a region closer to the user. As an additional example, suppose that the user attention system 116 determines that a correlation exists between the sound and the change in the gaze point 710 of the user and information received from the eye tracking system 112 indicates that the gaze point 710 of the user has changed. In this example, to diminish or de-emphasize the sound, the audio system 114 may decrease its volume relative to other sounds, filter out the sound, or change its spatialization so that it appears to originate from a region further from the user.

The audio system 114 may modify 660 the sound based on various types of information. In various embodiments, the audio system 114 may modify 660 the sound based on a set of rules (e.g., stored in the data store 335). In such embodiments, the set of rules may describe how and when a sound detected 630 by the audio system 114 should be modified 660 (e.g., by enhancing or emphasizing it, by diminishing or de-emphasizing it, etc.). For example, the set of rules may indicate that a sound detected 630 by the audio system 114 should be modified 660 if the user attention system 116 determines 650 that the user's attention has shifted. In this example, the set of rules may indicate that the sound should be modified 660 by enhancing or emphasizing it if it originates from an object of interest 715 of the user. Continuing with this example, the set of rules also may indicate that the sound should be modified 660 by diminishing or de-emphasizing it if it originates from a different object. In various embodiments, the audio system 114 also may modify 660 the sound based on a set of preferences associated with the user (e.g., stored in the data store 335). In such embodiments, the set of preferences also may describe how and when a sound detected 630 by the audio system 114 should be modified 660. For example, the set of preferences may indicate that a sound belonging to a music category should be enhanced between 6:00 PM and 9:00 PM when the user is at home or anytime the user is at a concert hall and that a sound belonging to an ambient noise category should be diminished when the user is in a car. In some embodiments, the audio system 114 also or alternatively may modify 660 the sound based on instructions received from the user attention system 116. For example, based on instructions received from the user attention system 116, the audio system 114 may modify 660 the sound based on a translation of a language associated with the sound. In this example, the audio system 114 may modify 660 the sound by changing its spatialization so that the detected (i.e., untranslated) sound appears to originate from a region further from the user and the translation appears to originate from a region closer to the user.

The audio system 114 may then communicate 670 (e.g., using the transducer array 310) the modified sound to the user. For example, the audio system 114 may communicate 670 the modified sound to the user via one or more speakers 560, a tissue transducer 570, etc. In embodiments in which the user attention system 116 translates a language associated with the sound detected 630 by the audio system 114, the translation may be presented to the user audibly (e.g., as speech) or visually (e.g., as subtitles). In embodiments in which the translation is presented visually, the user attention system 116 may send (e.g., using the language module 450) the translation to a device including one or more display elements 520 (e.g., a headset 110, a mobile device, etc.) that may be used to present the translation to the user.

In some embodiments, the audio system 114 also or alternatively may replay the sound. In various embodiments, the audio system 114 may replay the sound based on a set of rules (e.g., stored in the data store 335, 460). For example, suppose that the audio system 114 employs always on recording and the user attention system 116 has determined that the user is listening to an audio book at home and later determines 650 that the user's attention has shifted because the user is falling asleep. In this example, based on one or more rules, the audio system 114 may replay the sound (e.g., the portion of the audio book that was playing when the user attention system 116 determined that the user was falling asleep) when the user attention system 116 determines that the user is awake or upon receiving a request from the user to replay it.

Furthermore, in embodiments in which the user attention system 116 determines a response that includes providing haptic feedback to the user, replaying video data (e.g., via a mobile device coupled to or including the eye tracking system 112, the audio system 114, and/or the user attention system 116), etc., the response also may be communicated to the user. For example, suppose that the user attention system 116 has sent instructions associated with a response to a smartwatch coupled to the eye tracking system 112, the audio system 114, and/or the user attention system 116 for execution. In this example, if the response includes haptic feedback, the smartwatch may provide the haptic feedback to the user (e.g., by vibrating, pulsing, etc.). As an additional example, suppose that the user attention system 116 has sent instructions associated with a response to a mobile device coupled to the eye tracking system 112, the audio system 114, and/or the user attention system 116 for execution. In this example, if the response corresponds to replaying video data, the mobile device may replay the video data.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   tracking, at an eye tracking system, a position and an orientation of each eye of a user of the eye tracking system;
   determining a gaze point of the user based at least in part on the position and the orientation of each eye;
   detecting, at an audio system coupled to the eye tracking system, a sound in an environment of the user;
   detecting, at the eye tracking system, a change in the gaze point of the user;
   determining whether an attention of the user has shifted based at least in part on applying a machine learning model to a set of attributes of the change in the gaze point of the user to predict a likelihood that the attention of the user has shifted;
   determining whether the attention of the user has shifted based at least in part on the predicted likelihood that the attention of the user has shifted;
   responsive to determining the attention of the user has shifted, modifying the sound at the audio system; and
   communicating the modified sound to the user.

2. The method of claim 1, wherein determining whether the attention of the user has shifted is further based at least in part on a correlation between the sound detected in the environment of the user and the change in the gaze point of the user, wherein the correlation is based at least in part on one or more of: a time at which the sound was detected, a time at which the change in the gaze point of the user was detected, a first direction from which the sound was detected, and a second direction of the change in the gaze point of the user.

3. The method of claim 2, wherein the correlation is based at least in part on the change in the gaze point of the user away from an object of interest towards the first direction from which the sound was detected within a threshold amount of time of detecting the sound.

4. The method of claim 3, further comprising:
   detecting, at the audio system, an additional sound in the environment of the user;
   determining a source of the additional sound in the environment of the user based at least in part on the additional sound; and
   identifying the object of interest based at least in part on the source of the additional sound and the gaze point of the user.

5. The method of claim 1, wherein determining whether the attention of the user has shifted comprises:

determining whether one or more of: each eye of the user has been closed for at least a threshold amount of time and a pupil size of each eye of the user has changed for at least a threshold amount of time.

6. The method of claim 1, wherein:
receiving the set of attributes associated with a plurality of changes in gaze points of the user,
receiving, for each change in gaze point of the plurality of changes in gaze points of the user, a label indicating whether the attention of the user has shifted, and
training the machine learning model based at least in part on the set of attributes and the label for each of the plurality of changes in gaze points of the user.

7. The method of claim 1, wherein modifying the sound comprises:
executing one or more selected from the group consisting of: changing a volume of the sound, filtering the sound, and changing a spatialization of the sound.

8. The method of claim 1, wherein modifying the sound comprises:
receiving information identifying a first language associated with the user;
identifying a second language associated with the sound;
comparing the first language associated with the user with the second language associated with the sound;
determining the first language and the second language are different based at least in part on the comparing;
translating the second language associated with the sound to the first language associated with the user; and
modifying the sound based at least in part on the translated second language associated with the sound.

9. The method of claim 1, wherein modifying the sound comprises:
identifying a language associated with the sound;
determining an intelligibility of the sound based at least in part on the language associated with the sound; and
modifying the sound based at least in part on the intelligibility of the sound.

10. The method of claim 1, wherein the sound is modified based at least in part on information describing a context associated with the user and a set of preferences associated with the user, wherein the information describing the context associated with the user comprises one or more selected from the group consisting of: an environment of the user, an action being performed by the user, and a time associated with the user.

11. A non-transitory computer-readable storage medium comprising stored instructions, the instructions when executed by a processor of a device, causing the device to:
track, at an eye tracking system, a position and an orientation of each eye of a user of the eye tracking system;
determine a gaze point of the user based at least in part on the position and the orientation of each eye;
detect, at an audio system coupled to the eye tracking system, a sound in an environment of the user;
detect, at the eye tracking system, a change in the gaze point of the user;
determine whether an attention of the user has shifted based at least in part on applying a machine learning model to a set of attributes of the change in the gaze point of the user to predict a likelihood that the attention of the user has shifted;
determine whether the attention of the user has shifted based at least in part on the predicted likelihood that the attention of the user has shifted;
responsive to determining the attention of the user has shifted, modify the sound at the audio system; and
communicate the modified sound to the user.

12. The non-transitory computer-readable storage medium of claim 11, wherein determine whether the attention of the user has shifted is further based at least in part on a correlation between the sound detected in the environment of the user and the change in the gaze point of the user, wherein the correlation is based at least in part on one or more of: a time at which the sound was detected, a time at which the change in the gaze point of the user was detected, a first direction from which the sound was detected, and a second direction of the change in the gaze point of the user.

13. The non-transitory computer-readable storage medium of claim 12, wherein the correlation is based at least in part on the change in the gaze point of the user away from an object of interest towards the first direction from which the sound was detected within a threshold amount of time of detecting the sound.

14. The non-transitory computer-readable storage medium of claim 13, further comprising stored instructions that, when executed, cause the device to:
detect, at the audio system, an additional sound in the environment of the user;
determine a source of the additional sound in the environment of the user based at least in part on the additional sound; and
identify the object of interest based at least in part on the source of the additional sound and the gaze point of the user.

15. The non-transitory computer-readable storage medium of claim 11, wherein the stored instructions to determine whether the attention of the user has shifted further comprise stored instructions that, when executed, cause the device to:
determine whether one or more of: each eye of the user has been closed for at least a threshold amount of time and a pupil size of each eye of the user has changed for at least a threshold amount of time.

16. The non-transitory computer-readable storage medium of claim 11, wherein the stored instructions to determine whether the attention of the user has shifted further comprise stored instructions that, when executed, cause the device to:
receive the set of attributes associated with a plurality of changes in gaze points of the user,
receive, for each change in gaze point of the plurality of changes in gaze points of the user, a label indicating whether the attention of the user has shifted, and
train the machine learning model based at least in part on the set of attributes and the label for each of the plurality of changes in gaze points of the user.

17. The non-transitory computer-readable storage medium of claim 11, wherein the stored instructions to modify the sound further comprise stored instructions that, when executed, cause the device to:
execute one or more selected from the group consisting of: changing a volume of the sound, filtering the sound, and changing a spatialization of the sound.

18. The non-transitory computer-readable storage medium of claim 11, wherein the stored instructions to modify the sound further comprise stored instructions that, when executed, cause the device to:
receive information identifying a first language associated with the user;
identify a second language associated with the sound;

compare the first language associated with the user with the second language associated with the sound;

determine the first language and the second language are different based at least in part on the comparing;

translate the second language associated with the sound to the first language associated with the user; and modify the sound based at least in part on the translated second language associated with the sound.

19. The non-transitory computer-readable storage medium of claim 11, wherein the stored instructions to modify the sound further comprise stored instructions that, when executed, cause the device to:

identify a language associated with the sound;

determine an intelligibility of the sound based at least in part on the language associated with the sound; and modify the sound based at least in part on the intelligibility of the sound.

20. The non-transitory computer-readable storage medium of claim 11, wherein the sound is modified based at least in part on information describing a context associated with the user and a set of preferences associated with the user, wherein the information describing the context associated with the user comprises one or more selected from the group consisting of: an environment of the user, an action being performed by the user, and a time associated with the user.

* * * * *